US012757181B2

(12) United States Patent
Fu et al.

(10) Patent No.: US 12,757,181 B2
(45) Date of Patent: Oct. 6, 2026

(54) METHODS AND DEVICES FOR CONFIGURING A PLURALITY OF BEAMS FOR TRANSMITTING DATA

(71) Applicant: Samsung Electronics Co., Ltd., Suwon-si (KR)

(72) Inventors: Jingxing Fu, Beijing (CN); Feifei Sun, Beijing (CN); Sa Zhang, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 563 days.

(21) Appl. No.: 17/962,134

(22) Filed: Oct. 7, 2022

(65) Prior Publication Data

US 2023/0115804 A1 Apr. 13, 2023

(30) Foreign Application Priority Data

Oct. 8, 2021 (CN) .......................... 202111173223.4
Dec. 21, 2021 (CN) ......................... 202111572178.X

(51) Int. Cl.
*H04W 72/04* (2023.01)
*H04W 72/044* (2023.01)
*H04W 72/53* (2023.01)

(52) U.S. Cl.
CPC ......... *H04W 72/046* (2013.01); *H04W 72/53* (2023.01)

(58) Field of Classification Search
CPC ............................ H04W 72/046; H04W 72/53
See application file for complete search history.

(56) References Cited

U.S. PATENT DOCUMENTS 11,019,605 B2 5/2021 Chendamarai Kannan et al.
2019/0253220 A1* 8/2019 Kim .................... H04B 7/0695
(Continued)

FOREIGN PATENT DOCUMENTS

EP 3 890 395 A1 10/2021
WO 2021/021428 A1 2/2021
(Continued)

OTHER PUBLICATIONS

3GPP TS 38.213 V17.3.0, 3rd Generation Partnership Project; Technical Specification Group Radio Access Network; NR; Physical layer procedures for control (Release 17) (Sep. 2022).
(Continued)

*Primary Examiner* — Mewale A Ambaye
(74) *Attorney, Agent, or Firm* — Jefferson IP Law, LLP

(57) ABSTRACT

The disclosure relates to a fifth generation (5G) or sixth generation (6G) communication system for supporting a higher data transmission rate. A communication method, an apparatus, an electronic device, and a computer-readable storage medium, which belong to the field of wireless communication technology are provided. The method is performed by a network device, and the method includes receiving first information used to configure at least one first beam for transmitting information, determining at least one first beam based on the first information, and transmitting information based on the determined at least one first beam. Based on the solutions provided by the embodiments of the disclosure, it is possible to implement flexible configuration of beams used by network devices, provide information transmission performance, and meet application requirements better.

12 Claims, 21 Drawing Sheets

(56) References Cited

U.S. PATENT DOCUMENTS

| | | | | |
|---|---|---|---|---|
| 2020/0221485 | A1* | 7/2020 | Cirik | H04L 5/0048 |
| 2020/0229187 | A1* | 7/2020 | Marinier | H04W 72/0446 |
| 2020/0351129 | A1* | 11/2020 | Kwak | H04W 76/27 |
| 2021/0185723 | A1* | 6/2021 | Abedini | H04W 72/23 |
| 2021/0258107 | A1* | 8/2021 | Khoshnevisan | H04L 1/1614 |
| 2021/0288713 | A1 | 9/2021 | Gharavi et al. | |
| 2021/0297144 | A1 | 9/2021 | Abedini et al. | |
| 2022/0225362 | A1* | 7/2022 | Yi | H04L 1/189 |
| 2022/0225369 | A1* | 7/2022 | Park | H04W 72/0453 |
| 2023/0137523 | A1* | 5/2023 | Babaei | H04L 1/1887 370/329 |

FOREIGN PATENT DOCUMENTS

| | | | |
|---|---|---|---|
| WO | 2021/026561 | A1 | 2/2021 |
| WO | 2021/080711 | A1 | 4/2021 |

OTHER PUBLICATIONS

Extended European Search Report dated Jan. 16, 2025; European Appln. No. 22878964.0-1206 / 4413763 PCT/KR2022015173.

International Search Report and written opinion dated Jan. 30, 2023, issued in International Application No. PCT/KR2022/015173.

European Office Action dated Feb. 5, 2026, issued in European Application No. 22878964.0.

European Office Action dated Jul. 16, 2026, issued in European Application No. 22878964.0.

* cited by examiner

METHODS AND DEVICES FOR CONFIGURING A PLURALITY OF BEAMS FOR TRANSMITTING DATA

CROSS-REFERENCE TO RELATED APPLICATION(S)

This application is based on and claims priority under 35 U.S.C. § 119 (a) of a Chinese patent application number 202111173223.4, filed on Oct. 8, 2021, in the Chinese Intellectual Property Office, and of a Chinese patent application number 202111572178.X, filed on Dec. 21, 2021, in the Chinese Intellectual Property Office, the disclosure of each of which is incorporated by reference herein in its entirety.

BACKGROUND

1. Field

The disclosure relates to a field of wireless communication technology. More particularly, the disclosure relates to a communication method, an apparatus, an electronic device, and a computer-readable storage medium.

2. Description of Related Art

Fifth generation (5G) mobile communication technologies define broad frequency bands such that high transmission rates and new services are possible, and can be implemented not only in "Sub 6 gigahertz (GHz)" bands such as 3.5 GHz, but also in "Above 6 GHz" bands referred to as millimeter wave (mmWave) including 28 GHz and 39 GHz. In addition, it has been considered to implement 6G mobile communication technologies (referred to as Beyond 5G systems) in terahertz (THz) bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BandWidth Part (BWP), new channel coding methods such as a Low Density Parity Check (LDPC) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as Vehicle-to-everything (V2X) for aiding driving determination by autonomous vehicles based on information regarding positions and states of vehicles transmitted by the vehicles and for enhancing user convenience, New Radio Unlicensed (NR-U) aimed at system operations conforming to various regulation-related requirements in unlicensed bands, new radio (NR) user equipment (UE) Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, Integrated Access and Backhaul (IAB) for providing a node for network service area expansion by supporting a wireless backhaul link and an access link in an integrated manner, mobility enhancement including conditional handover and Dual Active Protocol Stack (DAPS) handover, and two-step random access for simplifying random access procedures (2-step random access channel (RACH) for NR). There also has been ongoing standardization in system architecture/service regarding a 5G baseline architecture (for example, service-based architecture or service-based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with extended Reality (XR) for efficiently supporting Augmented Reality (AR), Virtual Reality (VR), Mixed Reality (MR) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, metamaterial-based lenses and antennas for improving coverage of terahertz band signals, high-dimensional space multiplexing technology using Orbital Angular Momentum (OAM), and Reconfigurable Intelligent Surface (RIS), but also full-duplex technology for increasing frequency efficiency of 6G mobile communication technologies and improving system networks, AI-based communication technology for implementing system optimization by utilizing satellites and AI from the design stage and internalizing end-to-end AI support functions, and next-generation distributed computing technology for implementing services at levels of complexity exceeding the limit of UE operation capability by utilizing ultra-high-performance communication and computing resources.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide efficient communication methods in a wireless communication system.

Additional aspects will be set forth in part in the description which follows and, in part, will be apparent from the description, or may be learned by practice of the presented embodiments.

In accordance with an aspect of the disclosure, a communication method performed by a first network device is provided. The method includes receiving first information used to configure a plurality of first beams for transmitting data, determining at least one first beam from the plurality of beams based on the first information, and transmitting the data based on the at least one first beam.

In accordance with another aspect of the disclosure, a communication device is provided. The communication device includes a receiving module, configured to receive first information to configure a plurality of first beams for transmitting data, a beam determining module, configured to determine at least one first beam from the plurality of first beams based on the first information, and a transceiver module, configured to communicating information based on the at least one first beam.

In accordance with another aspect of the disclosure, a communication method is provided. The method includes transmitting first information used to configure at least one first beam used by a first network device for transmitting data.

In accordance with another aspect of the disclosure, a communication device is provided. The communication device includes a communication module, configured to transmit first information used to configure at least one first beam used by a first network device for transmitting data.

In accordance with another aspect of the disclosure, an electronic device is provided. The electronic device includes a processor, and a memory, the processor and the memory are connected to each other, the memory stores a computer program, the computer program, that when executed by the processor, performs the method provided in any alternative embodiment of the disclosure.

In accordance with another aspect of the disclosure, a computer-readable storage medium is provided. The computer-readable storage medium stores a computer program, the computer program, that when executed by a processor, performs the method provided in any alternative embodiment of the disclosure.

In accordance with another aspect of the disclosure, a non-transitory computer program product is provided. The non-transitory computer program product includes a computer program, the computer program, that when executed by a processor, perform the method provided in any alternative embodiment of the disclosure.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
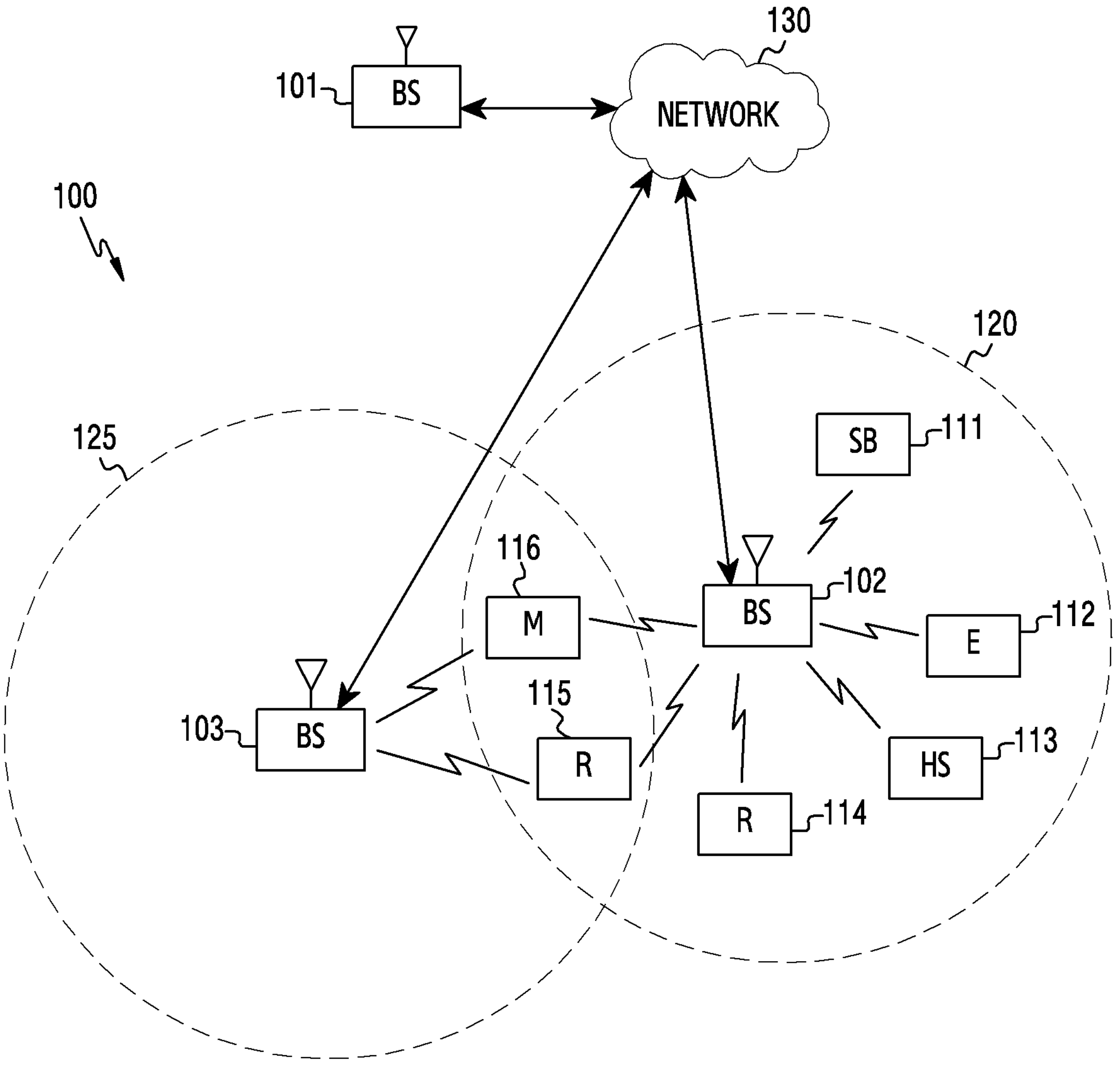
FIG. 1 is a schematic diagram of a wireless network according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Before undertaking the description below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

Definitions for other certain words and phrases are provided throughout this patent document. Those of ordinary skill in the art should understand that in many if not most instances, such definitions apply to prior as well as future uses of such defined words and phrases.

The embodiments of the disclosure are described in detail below, and the examples of the embodiments are illustrated in the drawings, where throughout the drawings, the same or similar reference numbers are used to depict the same or similar elements or elements having the same or similar functions. The embodiments described below with reference to the accompanying drawings are illustrative, and are only used to explain the disclosure, rather than being construed as limiting the disclosure.

It should be further understood that the expression "comprising" or "include" used in the specification of the disclosure means the existence of the features, integers, steps, operations, elements and/or components, but does not preclude the existence or addition of one or more other features, integers, steps, operations, elements, components and/or combinations thereof. It should be understood when an element is referred to as being "connected to" or "coupled to" another element, it may be directly connected or coupled to the other element, or an intervening element may be present. Furthermore, the terms "connected" or "coupled" used herein may include a wireless connection or a wireless coupling. The phrase "and/or" used herein includes all or any one and all combinations of one or more of the associated listed items.

FIG. 1 illustrates an example wireless network 100 according to an embodiment of the disclosure.

Referring to FIG. 1, the embodiment of wireless network 100 is for illustration only. Other embodiments of wireless network 100 may be used without departing from the scope of this disclosure.

Wireless network 100 includes gNodeB (gNB) 101, gNB 102 and gNB 103. The gNB 101 communicates with the gNB 102 and gNB 103. The gNB 101 also communicates with at least one Internet Protocol (IP) network 130, such as the Internet, a private IP network, or other data network.

Depending on the network types, other well-known terms such as "base station" or "access point" may be used instead of "gNodeB" or "gNB". For convenience, the terms "gNodeB" and "gNB" are used in this application document to refer to network infrastructure components that provide wireless access to remote terminals. Also, depending on network types, other well-known terms such as "mobile station", "subscriber station", "remote terminal", "wireless terminal" or "user equipment" may be used instead of "user equipment" or "UE". For convenience, the terms "user equipment" and "UE" are used in this application document to refer to a remote wireless device that wirelessly accesses a gNB, regardless of the UE being a mobile device (such as a mobile phone or smartphone) or being commonly considered as fixed equipment (such as a desktop computer or vending machine).

The gNB 102 provides wireless broadband access to the network 130 for a plurality of first user equipments (UEs) within the coverage area 120 of the gNB 102. The plurality of first UEs include: UE 111, which may be located in a small business (SB); UE 112, which may be located in an enterprise (E); UE 113, which may be located in a WiFi hotspot (HS); UE 114, which may be located in a first residence (R); UE 115, which may be located in a second residence (R); UE 116, which may be a mobile device (M), such as a cellular phone, wireless laptop, wireless PDA, and the like. The gNB 103 provides wireless broadband access to the network 130 for a plurality of second UEs within the coverage area 125 of the gNB 103. The plurality of second UEs include UE 115 and UE 116. In some embodiments, one or more of gNBs 101-103 are capable of communicating with each other and communicating with UEs 111-116 by using 5G, Long Term Evolution (LTE), long-term evolution advanced (LTE-A), worldwide interoperability for microwave access (WiMAX), or other advanced wireless communication technologies.

Dashed lines show approximate ranges of coverage areas 120 and 125, the approximate ranges are shown as approximately circular for purposes of illustration and explanation only. It should be clearly understood that the coverage areas associated with gNBs, such as coverage areas 120 and 125, can have other shapes, including irregularities, which are depending on the configuration of the gNB and changes in the radio environment associated with natural and man-made obstacles.

As described in more detail below, one or more of gNB 101, gNB 102, and gNB 103 include a two-dimensional (2D) antenna array as described in embodiments of the disclosure. In some embodiments, one or more of gNB 101, gNB 102, and gNB 103 support codebook designs and structures for systems with 2D antenna arrays.

Although FIG. 1 illustrates an example of a wireless network 100, it may make various changes to FIG. 1. For example, wireless network 100 may include any number of gNBs and any number of UEs in any suitable arrangement. Also, gNB 101 may communicate directly with any number of UEs and provide wireless broadband access to network 130 for those UEs. Similarly, each gNB 102-103 is capable of communicating directly with the network 130 and provides direct wireless broadband access to the network 130 for UE. Furthermore, gNBs 101, 102 and/or 103 can provide access to other or additional external networks, such as external telephone networks or other types of data networks.

Figure 2A:
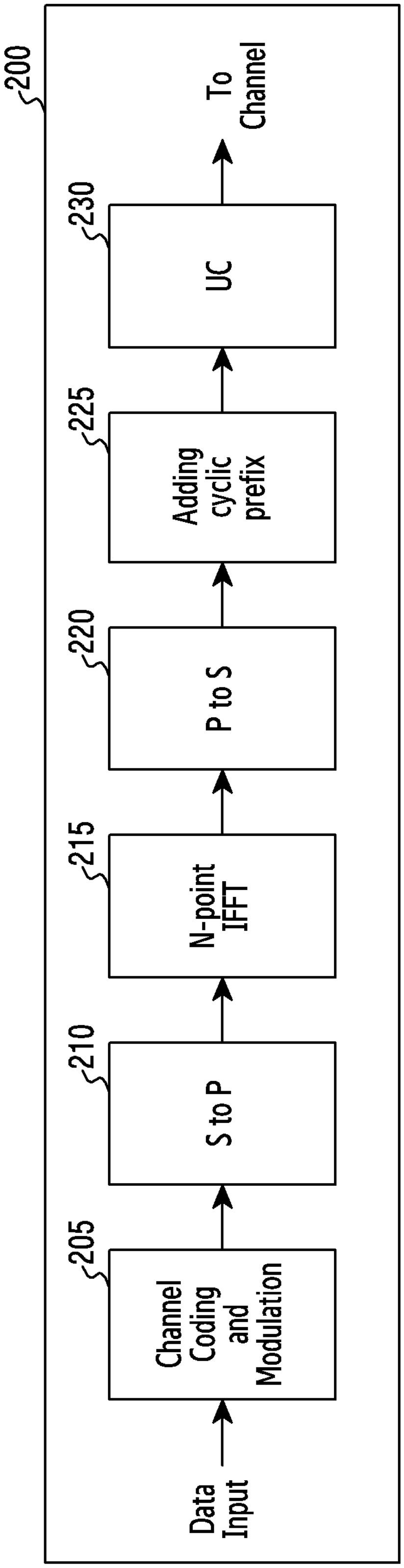
FIG. 2A is a schematic diagram of a wireless transmitting path according to an embodiment of the disclosure.
Figure 2B:
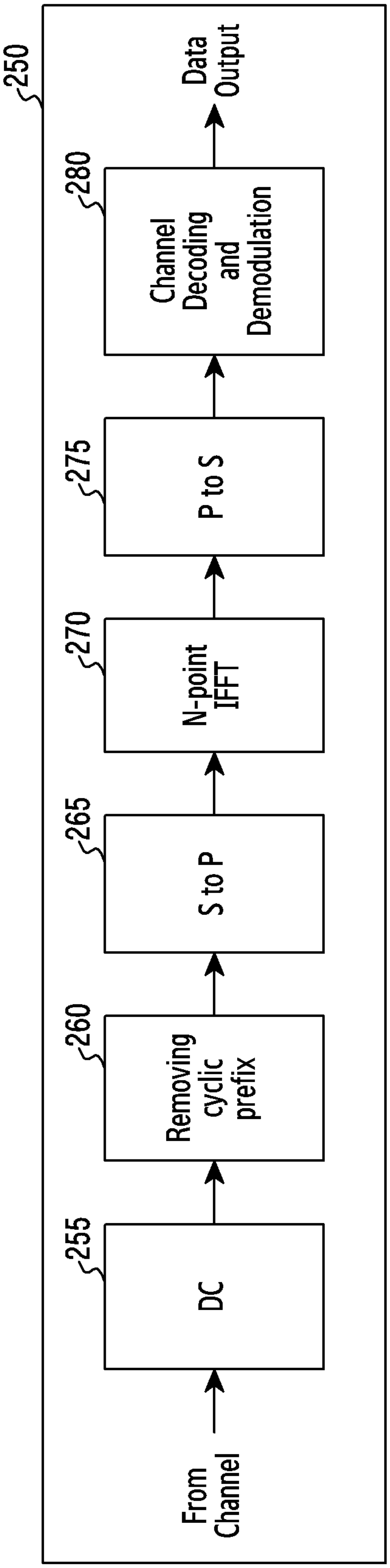
FIG. 2B is a schematic diagram of a wireless receiving path according to an embodiment of the disclosure.

FIGS. 2A and 2B illustrate example wireless transmitting and receiving paths according to various embodiments of the disclosure.

Referring to FIGS. 2A and 2B, in the following description, a transmitting path 200 may be described as being implemented in a gNB, such as gNB 102, while a receiving path 250 may be described as being implemented in a UE, such as UE 116. However, it should be understood that the receiving path 250 may be implemented in the gNB and the transmitting path 200 may be implemented in the UE. In some embodiments, the receiving path 250 is configured to support codebook designs and structures for systems having 2D antenna arrays as described in embodiments of the disclosure.

The transmitting path 200 includes a channel coding and modulation block 205, a serial-to-parallel (S to P) block 210, a N-point inverse fast Fourier transform (IFFT) block 215, a parallel-to-serial (P to S) block 220, an adding cyclic prefix block 225, and an up-converter (UC) 230. The receiving path 250 includes a down-converter (DC) 255, removing cyclic prefix block 260, a serial to parallel (S to P) block 265, a N-point fast Fourier transform (FFT) block 270, a parallel to serial (P to S)) block 275, and a channel decoding and demodulation block 280.

In the transmitting path 200, the channel coding and modulation block 205 receives a set of information bits, applies coding (such as low density parity check (LDPC) coding), and modulates input bits (such as using quadrature phase shift keying (QPSK) or quadrature amplitude modulation (QAM)) to generate a sequence of frequency-domain modulation symbols. The serial-to-parallel (S to P) block 210 converts (e.g., de-multiplexes) serial modulation symbols into parallel data to generate N parallel symbol streams, where N is the number of IFFT/IFFT points used in the gNB 102 and UE 116. The N-point IFFT block 215 performs an IFFT operation on the N parallel symbol streams to generate a time-domain output signal. The parallel-to-serial block 220 converts (e.g., multiplexes) parallel time-domain output symbols from N-point IFFT block 215 to generate a serial time-domain signal. The adding cyclic prefix block 225 inserts a cyclic prefix into the time domain signal. The up-converter 230 modulates (e.g., up-converts) the output of the added cyclic prefix block 225 to an RF frequency for transmission via a wireless channel. The signal can also be filtered at baseband before being converting to the RF frequency.

The RF signal transmitted from the gNB 102 reaches the UE 116 after passing through the wireless channel, and the reverse of the operation at the gNB 102 is performed at the UE 116. The down-converter 255 down-converts the received signal to a baseband frequency, and the removing cyclic prefix block 260 removes the cyclic prefix to generate a serial time domain baseband signal. The serial-to-parallel block 265 converts the time-domain baseband signal to a parallel time-domain signal. The N-point FFT block 270 performs an FFT algorithm to generate N parallel frequency domain signals. The parallel-to-serial block 275 converts the parallel frequency domain signal into a sequence of modulated data symbols. The channel decoding and demodulation block 280 demodulates and decodes the modulation symbols to recover the original input data stream.

Each of the gNBs 101-103 may implement a transmitting path 200 similar to that for transmitting to the UEs 111-116 in the downlink, and may implement a receiving path 250 similar to that makes receiving from the UEs 111-116 in the uplink. Similarly, each of the UEs 111-116 may implement a transmitting path 200 for transmitting to the gNBs 101-103 in the uplink, and may implement a receiving path 250 200 for receiving from the gNBs 101-103 in the downlink.

Each of the components referring to FIGS. 2A and 2B may be implemented by using hardware only, or a combination of hardware and software/firmware. As an example, at least some of the components in FIGS. 2A and 2B may be implemented in software, while other components may be implemented in configurable hardware or a combination of software and configurable hardware. For example, FFT block 270 and IFFT block 215 may be implemented as configurable software algorithms, where the value of point number N may be modified depending on the implementation.

Furthermore, although described as using FFTs and IFFTs, it is illustrative only and should not be construed as limiting the scope of the disclosure. Other types of transforms can be used, such as discrete Fourier transform (DFT) and inverse discrete Fourier transform (IDFT) functions. It should be understood that for DFT and IDFT functions, the value of variable N can be any integer (such as 1, 2, 3, 4, etc.), while for FFT and IFFT functions, the value of variable N can be any integer as a power of 2 (such as 1, 2, 4, 8, 16, etc.).

Although FIGS. 2A and 2B illustrate examples of wireless transmitting and receiving paths, it may make various changes to FIGS. 2A and 2B. For example, the various components in FIGS. 2A and 2B can be combined, further subdivided or omitted, and additional components can be added according to particular requirements. Furthermore, FIGS. 2A and 2B are intended to illustrate examples of the types of transmitting and receiving paths that can be used in a wireless network. Any other suitable architecture can be used to support wireless communication in a wireless network.

Figure 3A:
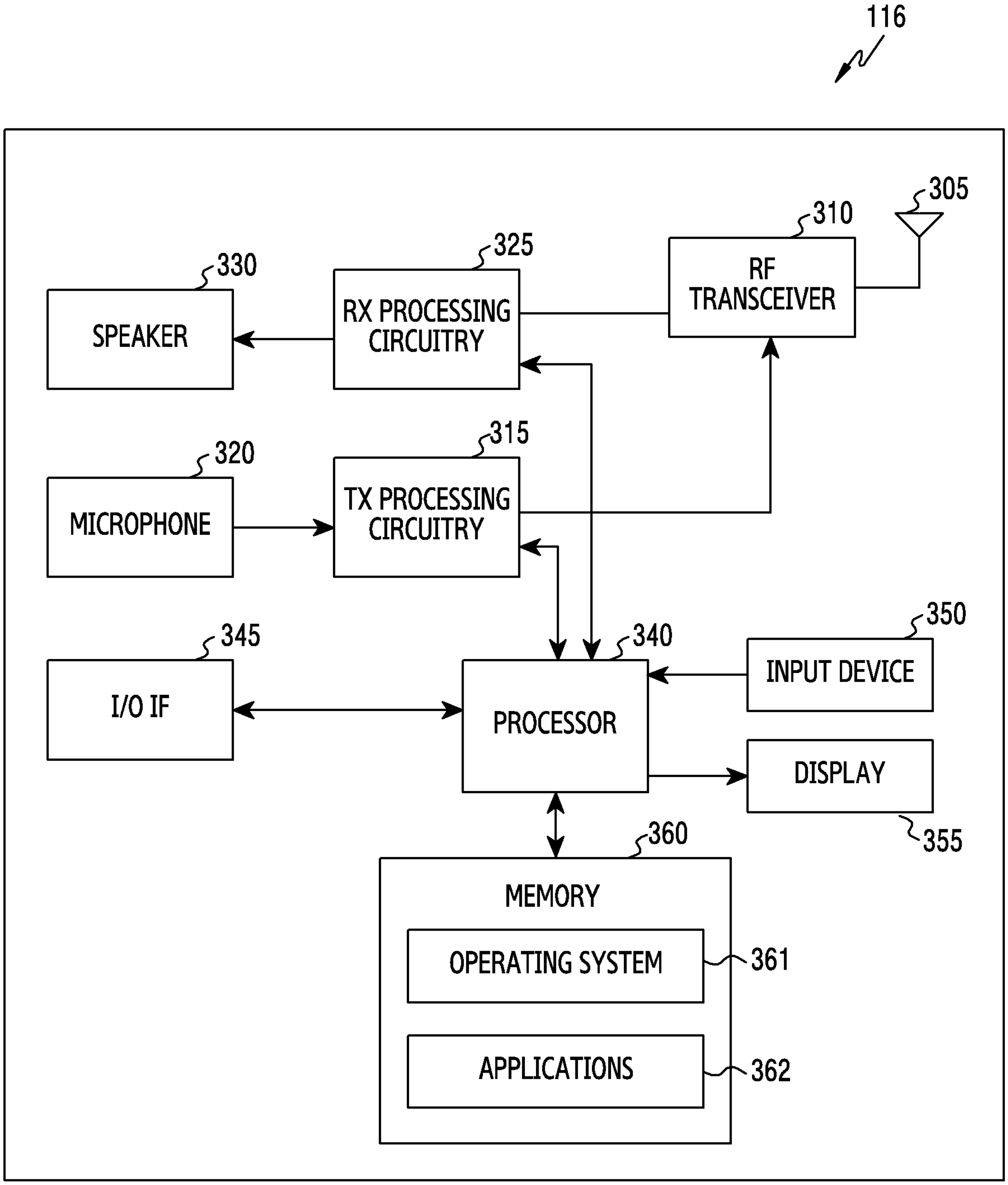
FIG. 3A is a schematic structural diagram of a user equipment according to an embodiment of the disclosure.

FIG. 3A illustrates an example UE 116 according to an embodiment of the disclosure. The embodiment of UE 116 referring to FIG. 3A is for illustration only, and UEs 111-115 of FIG. 1 can have the same or similar configuration. However, UEs have a wide variety of configurations, and FIG. 3A does not limit the scope of the disclosure to any particular implementation of a UE. For example, the UE 116 may include more or fewer components than those described above. In addition, the UE 116 corresponds to the UE of the FIG. 15.

The UE 116 includes an antenna 305, a radio frequency (RF) transceiver 310, a transmit (TX) processing circuitry 315, a microphone 320, and a receive (RX) processing circuitry 325. The UE 116 also includes a speaker 330, a processor/controller 340, an input/output (I/O) interface 345, input device(s) 350, a display 355 and a memory 360. The memory 360 includes an operating system (OS) 361 and one or more applications 362.

The RF transceiver 310 receives an incoming RF signal transmitted by the gNBs of the wireless network 100 from the antenna 305. The RF transceiver 310 down-converts the incoming RF signal to generate an intermediate frequency (IF) or baseband signal. The IF or baseband signal is sent to a RX processing circuitry 325, which generates a processed baseband signal by filtering, decoding, and/or digitizing the baseband or IF signal. The RX processing circuitry 325 transmits the processed baseband signal to a speaker 330 (such as for voice data) or to a processor/controller 340 (such as for web browsing data) for being further processed.

The TX processing circuitry 315 receives analog or digital voice data from the microphone 320, or other outgoing baseband data (such as network data, email, or interactive video game data) from the processor/controller 340. The TX processing circuitry 315 encodes, multiplexes, and/or digitizes outgoing baseband data to generate processed baseband or IF signals. The RF transceiver 310 receives the outgoing processed baseband or IF signal from the TX processing circuitry 315 and up-converts the baseband or IF signal to an RF signal for being transmitted via antenna 305.

The processor/controller 340 may include one or more processors or other processing devices and execute the OS 361 stored in the memory 360 in order to control the overall operation of the UE 116. For example, the processor/controller 340 may control the reception of forward channel signals and the transmission of reverse channel signals through the RF transceiver 310, the RX processing circuitry 325, and the TX processing circuitry 315 according to well-known principles. In some embodiments, the processor/controller 340 includes at least one microprocessor or microcontroller.

The processor/controller 340 is also capable of performing other processes and programs residing in the memory 360, such as operations of channel quality measurement and reporting for systems having 2D antenna arrays as described in embodiments of the disclosure. The processor/controller 340 can move data into and out of the memory 360 as required by the execution process. In some embodiments, the processor/controller 340 is configured to execute the application 362 based on the OS 361 or in response to signals received from the gNB or operator. The processor/controller 340 is also coupled to an I/O interface 345, which provides the UE 116 with the ability to connect to other devices such as laptops and handheld computers. The I/O interface 345 is a communication path between these accessories and the processor/controller 340.

The processor/controller 340 is also coupled to input device(s) 350 and a display 355. An operator of UE 116 may use input device(s) 350 to input data into the UE 116. The display 355 may be a liquid crystal display or other display capable of presenting text and/or at least limited graphics (such as from a website). The memory 360 is coupled to the processor/controller 340. A portion of memory 360 may include a random access memory (RAM), while another portion of memory 360 may include a flash memory or other read only memory (ROM).

Although FIG. 3A illustrates an example of the UE 116, it may make various changes to FIG. 3A. For example, various components in FIG. 3A can be combined, further subdivided, or omitted, and additional components can be added according to particular requirements. As an example, the processor/controller 340 can be divided into multiple processors, such as one or more central processing units (CPUs) and one or more graphics processing units (GPUs). Furthermore, although FIG. 3A illustrates the UE 116 configured as a mobile phone or smartphone, the UE may be configured to operate as other types of mobile or stationary devices.

Figure 3B:
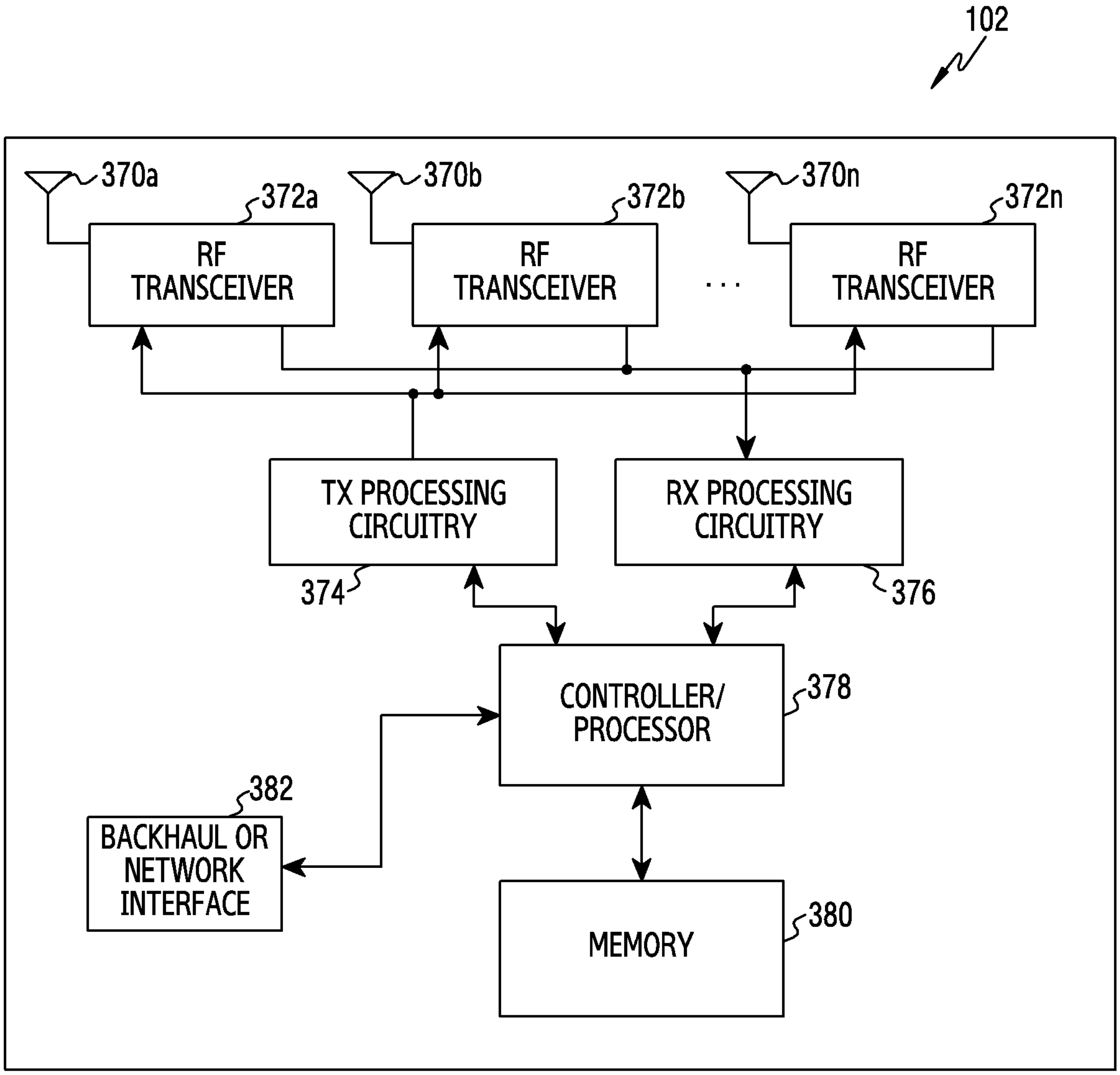
FIG. 3B is a schematic structural diagram of a base station according to an embodiment of the disclosure.

FIG. 3B illustrates an example gNB 102 according to an embodiment of the disclosure. The embodiment of gNB 102 shown in FIG. 3B is for illustration only, and other gNBs of FIG. 1 may have the same or similar configuration. However, gNBs have a wide variety of configurations, and FIG. 3B does not limit the scope of the disclosure to any particular implementation of gNBs. It should be noted that gNB 101 and gNB 103 may include the same or similar structure as that of gNB 102.

Referring to FIG. 3B, gNB 102 includes multiple antennas 370*a*-370*n*, multiple RF transceivers 372*a*-372*n*, a transmit (TX) processing circuitry 374, and a receive (RX) processing circuitry 376. In some embodiments, one or more of the plurality of antennas 370*a*-370*n* include a 2D antenna array. The gNB 102 also includes a controller/processor 378, a memory 380 and a backhaul or network interface 382. However, the components of the gNB 102 are not limited thereto. For example, the gNB 102 may include more or fewer components than those described above. In addition, the gNB 102 corresponds to the base station of the FIG. 14.

The RF transceivers 372*a*-372*n* receive incoming RF signals, such as signals transmitted by UEs or other gNBs, from the antennas 370*a*-370*n*. The RF transceivers 372*a*-372*n* down-convert incoming RF signals to generate IF or baseband signals. The IF or baseband signal is sent to the RX processing circuitry 376, which generates a processed baseband signal by filtering, decoding, and/or digitizing the baseband or IF signal. The RX processing circuitry 376 transmits the processed baseband signal to the controller/processor 378 for being further processed.

The TX processing circuitry 374 receives analog or digital data (such as voice data, network data, email or interactive video game data) from the controller/processor 378. The TX processing circuitry 374 encodes, multiplexes, and/or digitizes outgoing baseband data to generate a processed baseband or IF signal. The RF transceivers 372*a*-372*n* receive outgoing processed baseband or IF signals from the TX processing circuitry 374 and up-convert the baseband or IF signals to RF signals for transmission via the antennas 370*a*-370*n*.

The controller/processor 378 may include one or more processors or other processing devices that control the overall operation of gNB 102. For example, the controller/processor 378 may control the reception of forward channel signals and the transmission of backward channel signals through RF transceivers 372*a*-372*n*, RX processing circuitry 376, and TX processing circuitry 374 according to well-known principles. The controller/processor 378 may also support additional functions, such as more advanced wireless communication functions. For example, the controller/processor 378 may perform a BIS process, such as performed by a blind interference sensing (BIS) algorithm, and decode the received signal from which the interference signal is subtracted. Controller/processor 378 may support any of a wide variety of other functions in gNB 102. In some embodiments, the controller/processor 378 includes at least one microprocessor or microcontroller.

The controller/processor 378 is also capable of executing programs and other processes residing in the memory 380, such as a base OS. The controller/processor 378 may also support channel quality measurement and reporting for systems with 2D antenna arrays as described in embodiments of the disclosure. In some embodiments, the controller/processor 378 supports communication between entities such as web RTC. The controller/processor 378 may move data into and out of the memory 380 as required by the execution process.

The controller/processor 378 is also coupled to backhaul or network interface 382. The backhaul or network interface 382 allows the gNB 102 to communicate with other devices or systems over a backhaul connection or over a network. The backhaul or network interface 382 may support communication over any suitable wired or wireless connection(s). For example, when gNB 102 is implemented as part of a cellular communication system (such as one that supports 5G or New Radio Access Technology or NR, LTE, or LTE-A), the backhaul or network interface 382 may allow gNB 102 to communicate with other gNBs over wired or wireless backhaul connections. When gNB 102 is implemented as an access point, the backhaul or network interface 382 may allow gNB 102 to communicate with a larger network (such as the Internet) over a wired or wireless local area network or over a wired or wireless connection. The backhaul or network interface 382 includes any suitable structure that supports communication over wired or wireless connections, such as an Ethernet or RF transceiver.

Memory 380 is coupled to the controller/processor 378. A portion of memory 380 may include RAM, while another portion of memory 380 may include a flash memory or other ROM. In some embodiments, a plurality of instructions (such as the BIS algorithm) are stored in memory. The plurality of instructions are configured to cause the controller/processor 378 to perform the BIS process and decode the received signal after subtracting at least one interfering signal determined by the BIS algorithm.

As described in more detail below, the transmitting and receiving paths of gNB 102 (which are implemented by using RF transceivers 372*a*-372*n*, the TX processing circuitry 374, and/or the RX processing circuitry 376) support aggregated communications with FDD cells may include at least one processor and TDD cells.

Although FIG. 3B illustrates an example of a gNB 102, it may make various changes to FIG. 3B. For example, gNB 102 may include any number of respective components shown in FIG. 3A. As a specific example, an access point may include a number of backhaul or network interfaces 382, and a controller/processor 378 may support routing functions to route data between different network addresses. As another specific example, although a single instance including a TX processing circuitry 374 and a single instance including a RX processing circuitry 376, gNB 102 may include multiple instances of each component (such as one component corresponding to each RF transceiver).

It can be understood that the solutions provided by embodiments of the disclosure may be applicable to, but not limited to, the above wireless networks.

The technical solutions of the disclosure and how the technical solutions of the disclosure solve the above-mentioned technical problems will be described in detail below with illustrative examples. The following embodiments may be combined with each other, and the same or similar concepts or processes may not be repeated in some embodiments. The embodiments of the disclosure will be described below with reference to the accompanying drawings. The text and figures in the following description are provided by way of example only to assist the reader in understanding the disclosure. They are not intended and should not be construed to limit the scope of the disclosure in any way. While certain embodiments and examples have been provided, it will be apparent to those skilled in the art based on the disclosure herein that the illustrated embodiments and examples can be modified without departing from the scope of the disclosure.

In a wireless communication network, in order to enhance network coverage, it may forward information from a base station to UE (user equipment) and information from UE to the base station (such as data and/or control information, control information may also be referred to as control signaling) through network device. The name of the network device that forwards information is not limited in this embodiment of the disclosure, which may be referred to as a repeater, a smart repeater, a relay, a relay device, or other names. For convenience of description, a repeater is used as an example for description in this embodiment of the disclosure.

Figure 4:
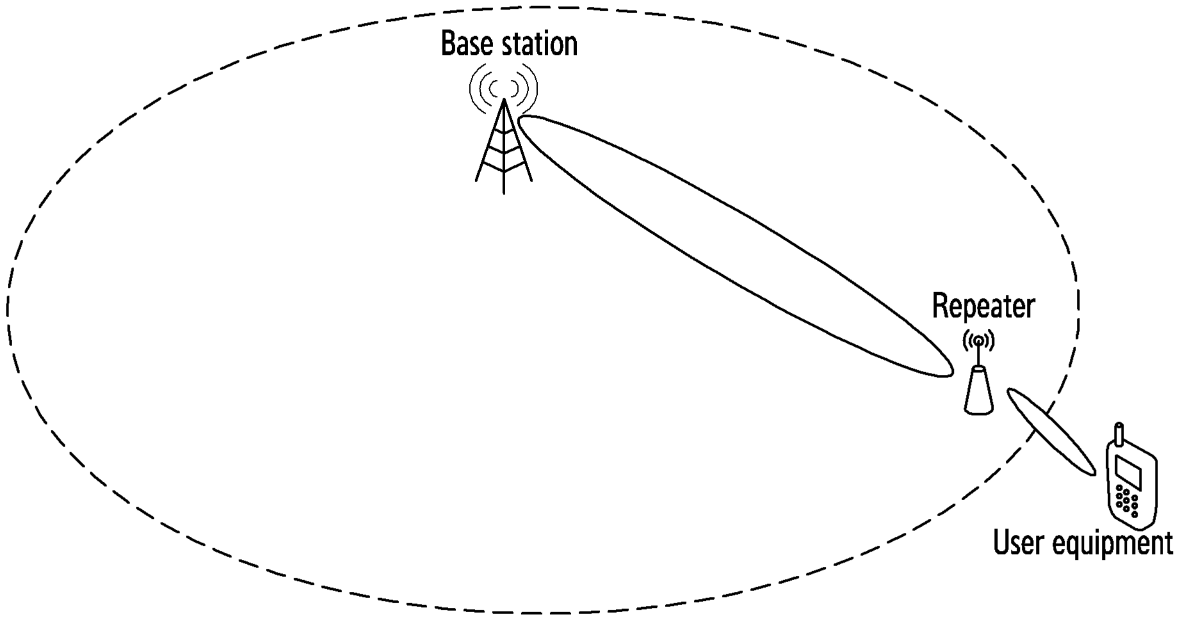
FIG. 4 is a schematic structural diagram of a wireless communication system according to an embodiment of the disclosure.

FIG. 4 illustrates a schematic structural diagram of a wireless communication system according to an embodiment of the disclosure.

Referring to FIG. 4, the data and/or control signaling transmitted by the UE to the base station may be sent to the base station through the repeater, and the data and/or control signaling transmitted by the base station to the UE may be sent to the UE through the repeater.

The embodiment of the disclosure provides a communication method in order to better meet communication requirements and improve communication performance. Based on this method, it is possible to effectively improve the performance of electronic devices (such as repeaters and UEs) for receiving and/or transmitting data and/or control information.

The method in the embodiment of the disclosure can be applied to a communication system in which the data and control information received by the repeater are directly forwarded on the same time-frequency resource without being demodulated and decoded, and can also be applied to a system in which the data and control information received by the repeater are demodulated and decoded and then forwarded on other resources.

In an optional case, the repeater works in a time-division multiplexing manner, that is, during a period of time, the repeater receives downlink data and/or downlink control information from the base station, and then the repeater forwards the received downlink data and/or the downlink control information to the UE, this period of time may be referred to as the downlink period; during another period of time, the repeater receives uplink data and/or uplink control information from the UE, and then the repeater forwards the received uplink data and/or the uplink control information to the base station, and this period of time may be referred to as the uplink period; and during yet another period of time, the repeater may also stop working.

Figure 5:
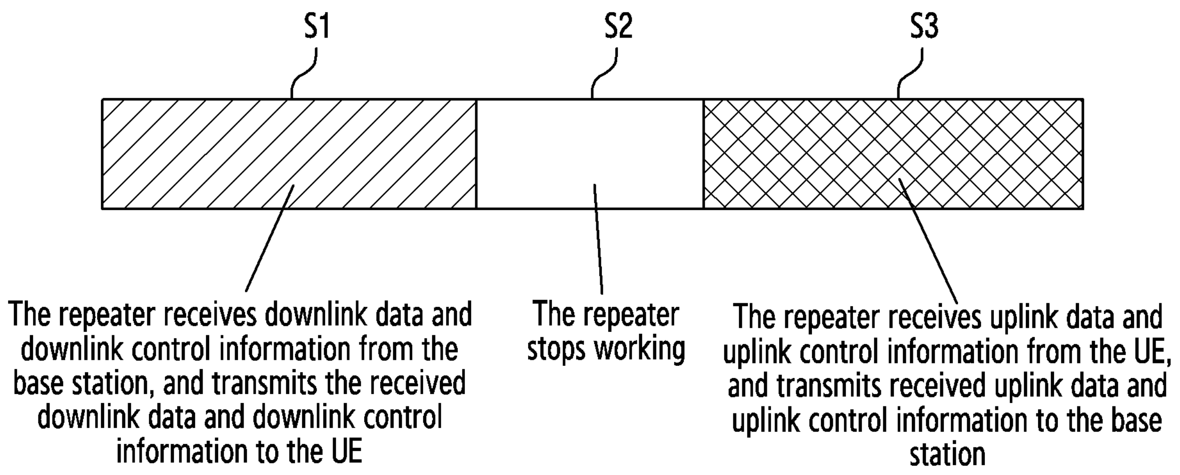
FIG. 5 is a schematic diagram of an optional working mode of a repeater according to an embodiment of the disclosure.

FIG. 5 is a schematic diagram of an optional working mode of a repeater according to an embodiment of the disclosure.

Referring to FIG. 5, the repeater receives downlink information (such as downlink data and downlink control information) from the base station during the downlink period S1, and transmits the downlink information to the UE, stops working during the period S2, receives uplink information from the UE during the period S3, and transmits the uplink information to the base station.

Optionally, the beam used by the repeater for receiving downlink data and/or downlink control information from the base station may be different from the beam used by the repeater for receiving uplink data and/or uplink control information from the UE, and thus it can better improve the receiving performance of the repeater. The beam used by the repeater for transmitting uplink data and/or uplink control information to the base station may be different from the beam used by the repeater for transmitting downlink data and/or downlink control information to the UE, and thus it can better improve the transmitting performance of the repeater.

Alternatively, in practical applications, the beam used by the repeater for receiving information (data and/or control information) from the base station may be same with the beam used by the repeater for receiving information from the UE, and the beam used by the repeater for transmitting information (data and/or control information) to the base station may be same with the beam used by the repeater for transmitting information to the UE.

For convenience of description, the beam used by the repeater for receiving information may be referred to as a receiving beam, and the beam used by the repeater for transmitting information may be referred to as a transmitting beam. The receiving beam includes a beam used by the repeater for receiving information from the UE, and the transmitting beam includes a beam used by the repeater for transmitting information to the UE.

The technical solutions of the disclosure and how the technical solutions of the disclosure solve the above technical problems will be described in detail hereinafter with reference to specific embodiments. The following embodiments may be combined with each other, and the same or similar concepts or processes may not be repeated in some embodiments. The embodiments of the disclosure will be described below with reference to the accompanying drawings.

Figure 6:
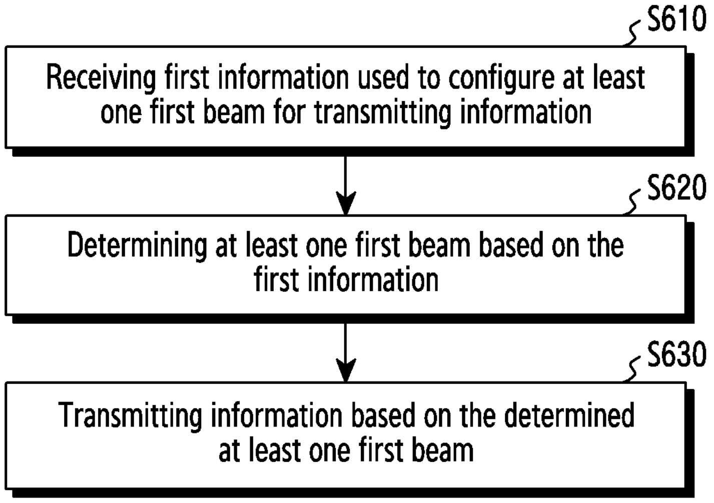
FIG. 6 is a schematic flowchart of a communication method according to an embodiment of the disclosure.

FIG. 6 illustrates a schematic flowchart of a communication method according to an embodiment of the disclosure. The method may be executed by a first network device (any network device in a communication system), and the name of the network device is not limited in this embodiment of the disclosure, for example, it may be referred to as a relay, a repeater or other names, and the repeater is used as an example for description below. Referring to FIG. 6, the method may include:

At operation S610: receiving first information used to configure at least one first beam for transmitting information;

At operation S620: determining at least one first beam based on the first information; and At operation S630: transmitting information based on the determined at least one first beam.

The name of the first information is not limited in this embodiment of the disclosure, and it may be referred to as configuration information, beam configuration, indication information, or other names. The first information may be newly added information (or message), or may be an improvement on the existing information in the existing communication system. For example, a new field may be added into the existing message, and the first information may be indicated by the field.

The first information is used by the repeater to determine a beam used by the repeater for transmitting and/or receiving information, and the form of contents included in the first information is not limited in this embodiment of the disclosure. For example, the first information may include identification information of the transmitting beam and/or the receiving beam (such as the number of the beams, the direction information of the beams, or the angle information of the beams, etc.), and the repeater may determine the first beam according to the identification information. For another example, the first information may include an indication value of the transmitting beam and/or the receiving beam, and a corresponding relationship is presented between the indication value and the beam (it may be agreed in the protocol, or the repeater determines by receiving higher layer information or physical layer information, etc.), the repeater can determine the beam used by the repeater for transmitting information according to the indication value in the first information and the above-mentioned corresponding relationship.

The above-mentioned first information is also used to indicate that each of first beams is a receiving beam or a transmitting beam.

That is to say, the first information may also include indication information of the beam type of respective first beams, and the information is used to indicate whether the beam is a transmitting beam or a receiving beam. The repeater can know, according to the information, whether the beam indicated by the base station is a beam for transmitting information to UE or a beam for receiving information transmitted by UE. The specific form of the indication information is not limited in this embodiment of the disclosure. For example, the first information indicates a first beam, and the first information may further include identification information of a beam type, and the identification information indicates whether the beam is a receiving beam or a transmitting beam. Identification information 1 represents the receiving beam, and identification information 0 represents the transmitting beam. For another example, the first information indicates two beams, and the first information may also include identification information of the beam types of the indicated two beams. For example, if the identification information is 00, it means that both beams are transmitting beams, and the identification If the identification information is 11, it means that both beams are receiving beams, and if the identification information is 01, it means that the beam with the earlier usage time is the transmitting beam, and the beam with the later usage time is the receiving beam. Certainly, other indication manners are also possible.

In an optional embodiment of the application, the first information includes a first indication value; the determining, based on the first information, at least one first beam, includes:

determining at least one first beam based on the first indication value.

That is, the first indication value is used to indicate the above at least one beam, and the beam indicated by the indication value is the beam used by the repeater for transmitting information.

Optionally, the determining at least one first beam based on the first indication value may include:

determining at least one first beam based on the first indication value and the first mapping relationship; wherein the first mapping relationship includes: a correspondence between each indication value in a set of first indication values and at least one beam corresponding to that indication value.

It can be understood that the above-mentioned set of first indication values may include one or more indication values, the one or more indication values include a first indication value, each indication value corresponds to at least one beam, and at least one beam corresponding to the first indication value is the beam used by the repeater for transmitting information.

The manner of acquiring the first mapping relationship is not limited in this embodiment of the disclosure. For example, it can be configured through higher layer signaling, be indicated through system information, and also be obtained through other implicit manners. As an example, Table 1 shows an optional form of the first mapping relationship.

TABLE 1

| Beam indication information value | Beam |
|---|---|
| 00 | Beam 1 |
| 01 | Beam 2 |
| 10 | Beam 3 |
| 11 | Beam 4 |

Table 1: corresponding relationship between beam indication information and beams In this example, each indication value in the set of first indication values may occupy two bits, and each beam indication information value (also referred to as a beam indication index value) in Table 1 is an indication value in the above set of first indication values. In this example, the number of indication values in the set of first indication values is 4, and each indication value corresponds to at least one beam, for example, the beam corresponding to indication value “00” is beam 1, the beam corresponding to indication value “01” is beam 2. If the first indication value in the first information received by the repeater is “10”, it may be determined based on the first indication value and the mapping relationship that the first beam is beam 3.

Based on the received first information, the repeater may determine the first beam used by the repeater for information transmission. The information source of the first information is not limited in this embodiment of the disclosure, and the first information may be transmitted by a higher layer to the repeater through the base station, or may be configured by the base station for the repeater.

Optionally, the above-mentioned receiving the first information may include:

receiving first signaling, where the first signaling carries the above-mentioned first information;

where the first signaling includes at least one of the following:

higher layer signaling, media access layer signaling, or physical layer signaling.

That is to say, the first information may be configured through higher layer signaling, media access layer (also referred to as medium access control (MAC) layer) signaling, or physical layer signaling (that is, downlink control information (DCI)).

As an optional solution, the first signaling may be physical layer signaling, that is, the base station transmits the beam configuration to the repeater by transmitting DCI, and the repeater obtains the first information by receiving the DCI transmitted by the base station.

In an optional embodiment of the disclosure, the above-mentioned receiving the first signaling may include at least one of the following:

acquiring the first signaling from a specific search space corresponding to the first network device (i.e., the repeater);

acquiring the first signaling from a common search space corresponding to the first network device.

As an optional implementation, the repeater may correspond to a specific search space. The name of the specific search space is not limited in this application. For example, it may be referred to as UE-specific Search (USS). It can be understood that USS is for repeaters. In this way, a transmitting beam and/or a receiving beam of a repeater can be notified in one DCI. The repeater may receive this DCI information in its specific search space (that is, the channel on which the repeater receives DCI (which can be referred to as the repeater beam indication channel or other names) may be the channel that carries the repeater-specific DCI), and determine its own transmitting beam and/or receiving beam according to the information in the DCI.

The number of bits of the beam indication information (that is, the first information) in the DCI may be L bits (L is a positive integer), for example, the value of L may be preset by the protocol, or configured by higher layer signaling, or determined by the number B of the beams required to be indicated (that is, the number of at least one first beam), for example, L may be rounded up to (log 2 (B)).

As an optional implementation, the DCI may also be transmitted in a common search space corresponding to the first network device (that is, a search space corresponding to a group of repeaters). With this method, the transmitting beams and/or the receiving beams of a group of repeaters (usually more than one) may be notified in one DCI, which can save the resources occupied by the DCI.

The DCI containing the first information is transmitted in the common search space, which can be referred to as a group-common DCI, a group of repeaters may receive this DCI, and then each repeater determines its corresponding first information in the DCI according to the DCI, and determines its own transmitting beam and/or receiving beam according to its corresponding first information. For example, the DCI may contain M pieces of information (that is, M pieces of first information, M is a positive integer, M≥1, and the value can be preset by the protocol or configured by higher layer signaling), and a piece of information indicates a beam for a repeater, that is, the DCI may be used to configure the beams corresponding to M repeaters, and each repeater may determine its own transmitting beam and/or receiving beam according to the corresponding information in the DCI.

In an optional embodiment of the application, the receiving the first information includes:

receiving second information, the second information may include at least one first information, the second information corresponds to a group of network devices, and a piece of first information is used to determine a beam used by a network device corresponding to the first information among a group of network devices for transmitting information. The determining at least one first beam based on the first information includes:

determining the first information corresponding to the first network device in the second information based on an identifier of the first network device; and determining the at least one first beam based on the determined first information.

As can be seen from the foregoing description, the second information (such as the group-common DCI) may carry beam indication information of at least one repeater (that is, the above-mentioned group of network devices), and the first network device is included in the group of network devices. At this time, after the current repeater (i.e., the first network device) receives the second information, it can determine the beam indication information (first information) corresponding to its own included in the second information based on the identifier of device, and determine at least one first beam for transmitting information based on its own beam indication information.

Optionally, the first information may include at least one second information and an identifier of a network device corresponding to each second information, and each repeater may directly determine its own second information according to its own identifier. Alternatively, the first information includes multiple pieces of second information, and implies a corresponding relationship between each second piece of information and its corresponding second network device, for example, the position relationship between multiple pieces of second information included in the first information and the first information implies the corresponding relationship between each second information and the identifier of its corresponding repeater, and each repeater may determine the first information which is located at the position corresponding to its identifier of the second information as its own first information. For example, the second information includes two pieces of information, each piece of information is a first information, and the position of fields indicating the two pieces of information in the second information implies which repeater corresponds to each piece of information, respectively. The piece of information indicated by the firstly appeared field corresponds to the repeater identified with a, and the piece of information indicated by the latterly appeared field corresponds to the repeater identified with b, then the repeater identified with a may determine the firstly appeared piece of information as its own corresponding piece of information after receiving the first information.

The specific form of the identifier of the above-mentioned network device (i.e., the repeater identifier (ID)) is not limited in this embodiment of the disclosure, and may be the unique identifier of the repeater in the entire network, or may be the identifier of repeater which belongs to the repeater group (at least one repeater corresponding to the first information), for example, the first information includes three pieces of second information (that is, corresponding to three repeaters), these three repeaters are a group of repeaters, and each repeater of the group of repeaters may correspond to an intra-group number (for example, the numbers are 1, 2, and 3 respectively), and the number may be used as the identifier of repeater.

In an optional embodiment of the disclosure, the method further includes:

obtaining first configuration information, where the first configuration information is used to configure a corresponding relationship between each piece of first information included in the at least one first information (i.e., second information) and an identifier of a network device corresponding to the first information among the group of network devices, the determining the first information corresponding to the first network device in the second information based on the identifier of the first network device includes:

determining the first information corresponding to the first network device in the second information based on the identifier of the first network device and the first configuration information.

The manner of acquiring the first configuration information is not limited in this embodiment of the disclosure. Optionally, the first configuration information may be provided to the repeater through higher layer signaling, or may be provided to the repeater through system messages, physical layer signaling, or other transmissions. After receiving the second information, the current repeater may find its corresponding first information in the above-mentioned corresponding relationship (that is, the corresponding relationship configured by the first configuration information) according to its device identifier, and determine which transmitting beam and/or receiving beam to be used by itself according to the found first information.

In an optional embodiment of the disclosure, the method further includes: determining the usage time of the at least one first beam.

transmitting information based on the determined at least one first beam, including:

transmitting information based on the determined at least one first beam and the usage time of the at least one beam.

For the repeater, the usage time of a beam refers to the effective time of a beam, that is, the time for the repeater using the beam. Optionally, the usage time of a beam may include the start time (i.e., S) and duration (denoted as T) of the beam. The start time is the time when the beam can be used, and the duration is the effective length of time that the beam can be used. The time unit of usage time is not limited in this embodiment of the disclosure, and may include but not limited to orthogonal frequency division multiplexing (OFDM) symbols, time slots, mini-slots, or others.

Optionally, when the second information includes multiple pieces of first information corresponding to multiple repeaters, the usage time of the at least one first beam can be determined by at least one of the following:

Manner a: determining the usage time of at least one first beam based on the determined first information, where each piece of first information included in the second information is also used to determine the usage time of the beam used by the network device corresponding to the first information time;

Manner b: determining the usage time of at least one first beam based on the first time indication information, where the second information further includes first time indication information, and the first time indication information is used to indicate the usage time of the beam used by each network device among a group of network devices for transmitting information;

Manner c: determining the second time indication information corresponding to the first network device in the second information based on the identifier of the first network device; determining the usage time of at least one first beam based on the determined second time indication information; where the second information also includes a first quantity of second time indication information, the first quantity is equal to the number of network devices in a group of network devices, and a piece of second time indication information is used to indicate the usage time of the beam used by the network device corresponding to the indication information among a group of network devices for transmitting information;

Manner d: receiving a third time indication information, the third time indication information is used to indicate the usage time of the beam used by each network device among a group of network devices for transmitting information; determining the usage time of at least one first beam based on the third time indication information;

Manner e: receiving time configuration information, where the time configuration information includes a second quantity of fourth time indication information, the second quantity is equal to the number of network devices in a group of network devices, and a piece of fourth time indication information is used to indicate the usage time of the beam used by the network device corresponding to the indication information among a group of network devices for transmitting information; determining the fourth time indication information corresponding to the first network device in the time configuration information based on the identifier of the first network device; determining the usage time of the at least one first beam based on the determined time indication information.

For manner a, each piece of first information included in the second information may indicate the usage time of at least one beam corresponding to the first information, in addition to configuring at least one beam used by the repeater corresponding to the first information for transmitting information. For example, the second information includes M pieces of information (i.e., the first information), each piece of information corresponds to a repeater, and each piece of information indicates at least one beam used by a repeater for transmitting information and the usage time of beams.

For manner b, the second information may include time indication information, in addition to at least one piece of first information, where the time indication information is used to indicate time information of beams used by the above group of network devices for transmitting information. For example, the second information includes M+1 pieces of information, where the M pieces of information are M pieces of first information, the other piece of information is time indication information, and each piece of information in the M pieces of information indicates at least one beam used by a repeater for transmitting information; the time indication information indicates the usage time of the beams corresponding to the M repeaters, that is, the time indication information of the M repeaters may be the same.

For manner c, the second information further includes several pieces of time indication information, each piece of time indication information corresponds to a network device in the above group of network devices, that is, the time indication information corresponds to the network device one by one. The current repeater (i.e., the first network device) can determine its corresponding time indication information from several pieces of time indication information according to its device identification. Optionally, determining the second time indication information corresponding to the first network device in the second information based on the identifier of the first network device may include at least one of the following:

determining the second time indication information corresponding to the first network device based on the identifier of the first network device and the first configuration information, where the first configuration information is further used to configure the corresponding relationship between each time indication included in the at least one piece of second time indication information and the identifier of the network device corresponding to the time indication information among the above group of network devices;

acquiring second configuration information, where the second configuration information is used to configure the corresponding relationship between each time indication information included in the at least one piece of second time indication information and the identifier of the network device corresponding to the time indication information among the above group of network devices; determining the second time indication information corresponding to the first network device included in the second information according to the identifier of the first network device and the second configuration information.

In an optional embodiment of the disclosure, when determining the first information and the second time indication information corresponding to the first network device, the following methods may also be used:

determining the first information corresponding to the first network device included in the second information according to the identifier of the first network device, and determining second time information corresponding to the first network device included in at least one piece of second time indication information according to the field position of the determined first information included in the second information; or determining the second time indication information corresponding to the first network device included in the second information according to the identifier of the first network device, and determining first information corresponding to the first network device included in at least one piece of first time indication information according to the field position of the determined second time indication information included in the second information.

That is to say, the first information and the second time indication information corresponding to one network device have a corresponding relationship, and one of them may be used to determine another one. For example, the second information corresponds to M repeaters, the second information includes M pieces of first information and M pieces of second time indication information, and it can be determined based on the identifier of the first network device that a second piece of first information included in the M pieces of first information is the first information corresponding to the first network device, and correspondingly, the second time indication information included in the M pieces of second time indication information is the second time indication information corresponding to the first network device.

For manner d and manner e, the beam and the usage time of the beam can be indicated separately, that is, the second information is used to indicate the beam used by each repeater, and the third time indication information/time configuration information separately indicates the usage time of beams used by a group of network devices. It should be noted that, on the premise that there is no logical contradiction, the above description of the first time indication information is also applicable to the third time indication information, and the description of the second time indication information is also applicable to the fourth time indication information.

This will not be repeated here. It should also be noted that, for the manner in which the second information includes one or more pieces of first information, in addition to the first information which is used to configure at least one beam used by the repeater corresponding to the first information for transmitting information, the second information may also include information for indicating type of respective beams, that is, for indicating whether each beam is a receiving beam or a transmitting beam. The first network device may determine at least one first beam that it may use and a type of each beam in the at least one first beam according to the received second information.

In this embodiment of the disclosure, the above-mentioned information transmission includes the transmitting of information and/or the receiving of information. Correspondingly, the at least one first beam may include at least one of the following:

at least one transmitting beam; at least one receiving beam.

Correspondingly, the information transmitted based on at least one first beam may include at least one of uplink information and downlink information, where the uplink information may include at least one of uplink data and uplink control information, and the downlink information includes at least one of downlink data and downlink control information.

The transmitting beam may be a beam used by the repeater for transmitting information (data and/or control information) to the UE, and correspondingly, the downlink information is the information transmitted by the repeater to the UE through the transmitting beam. The receiving beam may refer to a beam used by the repeater for receiving information transmitted by the UE, and correspondingly, the uplink information is information received by the repeater from the UE through the receiving beam. The first information may include beam type indication information, which is used to indicate whether each beam in the indicated at least one first beam is a receiving beam or a transmitting beam. For example, the first information indicates a first beam, and indicates that the type of the beam is a receiving beam, or the first information indicates two first beams, and indicates the beam type of each of the first beams, for example, beam a is the receiving beam and beam b is the transmitting beam.

Based on the method in this embodiment of the disclosure, dynamic configuration of the receiving beam and/or transmitting beam of the repeater may be implemented based on the first information, so that the repeater can be more intelligent when receiving and/or transmitting information, which improves the existing communication mode, realize the flexible configuration and use of network resources, and better meets the communication requirements.

In an optional embodiment of the disclosure, for the determined at least one first beam, the usage time of the beam may also be determined by at least one of the following:

determining the time information of the at least one first beam based on the first information;

acquiring third information, where the third information is used to determine the time information of the at least one first beam; determining the time information of the at least one first beam based on the third information.

Correspondingly, the above-mentioned transmission of information based on the determined at least one first beam includes:

transmitting information based on the at least one first beam and the time information of the at least one first beam.

The optional solution of the disclosure can also realize the dynamic management of the usage time of the beam, in addition to the flexible configuration of the beam used by the repeater.

The configuration of the time information of the beam may be implemented based on the first information, or may be implemented based on the third information, that is, the beam and the time information of the beam may be determined jointly or independently. That is to say, the first information can be used not only to configure the above-mentioned at least one first beam, but also to determine the time information of each beam in the at least one first beam.

The specific manner of determining the time information of the beam by using the first information or the third information can be configured according to requirements. For example, the first information may contain both a first field for determining the beam and a second field for determining the time information of the beam, and it may determine at least one first beam and the time information of the beam based on the contents of the first field and the second field. The specific acquisition method of the third information is also not limited in this embodiment of the disclosure. For example, the repeater may be determined by receiving higher layer signaling, physical layer signaling, or media access layer signaling, and the third information may also be agreement information.

That is, the information preset by the protocol. It can be known from the foregoing optional embodiment that the first information may include a first indication value, and at least one first beam used by the repeater for transmitting information may be determined according to the first indication value and the first mapping relationship (see the foregoing description).

Optionally, for the usage time of at least one first beam (that is, the time when the beam can be used, also referred to as the effective time), it can be determined by the following manners:

acquiring a second indication value, where the second indication value is used to configure the usage time of the at least one first beam;

determining the usage time of the at least one first beam based on the second indication value.

Optionally, determining the usage time of at least one first beam based on the second indication value includes:

determining the usage time of at least one first beam corresponding to the second indication value based on the second indication value and the third mapping relation; where the third mapping relation includes: the corresponding relationship between each indication value in a set of third indication values and the time information of at least one beam corresponding to the indication value.

The manner of acquiring the second mapping relationship is also not limited in this embodiment of the disclosure. For example, it can be configured through higher layer signaling, be indicated through system information, and also be obtained through other implicit manners. In practical applications, the second indication value and the first indication value may be the same or different. As an example, an optional form of the third mapping relationship is shown in Table 2.

TABLE 2

| Beam time indication index value | Start time (S) | Duration (T) |
|---|---|---|
| 00 | S1 | T1 |
| 01 | S2 | T2 |
| 10 | S3 | T3 |
| 11 | S4 | T4 |

Table 2: the corresponding relationship between beam time indication index value and start time(S) and duration (T)

In this example, the beam time indication index value is the indication value in the set of third indication values, each indication value may occupy two bits, and the set of third indication values include 4 of fourth indication values, where the start time and duration of the beam corresponding to the indication value "00" are S1 and T1, respectively, and the start time and duration of the beam corresponding to the indication value "01" are S2 and T2, respectively. In conjunction with the second mapping relationship shown in Table 2, if the second indication value received by the repeater is "10", it can be determined that the start time and duration of the first beam indicated by the first information are S3 and T3, respectively.

It should be noted that, in an optional embodiment of the disclosure, the time information of the beam may be the usage time of the beam, or may be information for determining the usage time of the beam. For example, in above Table 2, the start time S and the duration T may refer to the real start time and duration of the beam, or may be information for determining the start time and duration. For example, the start time may be a time offset value of the real start time of a beam relative to the acquisition time of the first information, and it may determine the real start time of the beam based on the time offset value and the acquisition time of the first information. Likewise, the duration may be the actual usage time of the beam or information for determining the duration.

The method for acquiring the second indication value is not limited in this embodiment of the disclosure. Optionally, the above-mentioned third indication value may be included in the first information, or may be included in the third information, and the acquisition is instructed by the base station through other manners.

As another optional implementation, the foregoing determining at least one first beam based on the first information includes: according to the first indication value and the second mapping relationship, determining at least one first beam corresponding to the first indication value and time information of the at least one first beam; where the second mapping relationship includes: corresponding relationship between each indication value of the set of the second indication values, at least one beam corresponding to each indication value, and the time information of respective beam corresponding to each indication value.

Correspondingly, the transmitting information based on at least one first beam includes:

transmitting information based on the at least one first beam and the usage time of the at least one first beam.

The set of second indication values include the first indication value. According to the first indication value, it may determine the at least one first beam and the usage time of the beam simultaneously.

In this optional solution, at least one first beam and time information of at least one beam can be jointly determined, which can save network resources. As an example, an optional form of the second mapping relationship is shown in Table 3.

TABLE 3

| beam indication index value | Beam | Start time (S) | Duration (T) |
|---|---|---|---|
| 00 | Beam 1 | S1 | T1 |
| 01 | Beam 2 | S2 | T2 |
| 10 | Beam 3 | S3 | T3 |
| 11 | Beam 4 | S4 | T4 |

Table 3: corresponding relationship between beam indication information, beam and beam time information In practical applications, at least one beam corresponding to a repeater may be one or more. In order to meet application requirements that the number of beams may be one or more, the above-mentioned second mapping relationship time information may include the time information of each beam corresponding to the indication value, for example, the beams corresponding to the indication value "00" are beam A and beam B, and the first mapping relationship includes the time information of the beam A corresponding to the indication value and the time information of the beam B corresponding to the indication value. Optionally, the second mapping relationship may further include the number of beams (which may be referred to as beam number) corresponding to each indication value. The beam indication index value (i.e., the first indication value) in this example is not only used to determine the first beam, but also used to determine the time information of each of first beams.

As another optional solution, the time information of each beam in the at least one beam corresponding to each first indication value or second indication value may be continuous or discontinuous in time. If it is continuous, the above second mapping relationship or the third mapping relationship may include the start time (or information for determining the start time) of one beam (for example, the first beam or the last beam in the order of time) in the at least one beam corresponding to each indication value and the duration (or information for determining the duration) of each of the at least one beam. As an optional example, an optional form of the second mapping relationship is shown in Table 4-1.

TABLE 4-1

| Beam indication index value | Number of beams | Beam | Start time (S) | Beam one's Duration | Beam two's Duration | Beam three's Duration |
|---|---|---|---|---|---|---|
| 00 | 1 | Beam 1 | S1 | T11 | | |
| 01 | 2 | Beam 1 and beam 2 | S2 | T12 | T22 | |
| 10 | 2 | Beam 3 and beam 4 | S3 | T13 | T23 | |
| 11 | 3 | Beam 1, beam 2, and beam 3 | S4 | T14 | T24 | T34 |

In this example, the number of beams corresponding to different beam indication index values may be one or more. When there are a plurality of (two or more) beams, the time information of the plurality of beams may be continuous in time, for example, the indication value "01" corresponds to beam 1 and beam 2, the start time of beam 1 is S2, the duration is T12, the start time of beam 2 is the end time of beam 1, and the duration of beam 2 is T22.

When the number of beams corresponding to the beam indication index value is more than one, if the time information of the multiple beams is discontinuous in time, the above-mentioned second mapping relationship or the third mapping relationship may include the start time (or information for determining the start time) of respective beam in the at least one beam corresponding to each indication value and the duration (or information for determining the duration) of each of the at least one beam. As an optional example, an optional form of the second mapping relationship is shown in Table 4-2.

TABLE 4-2

| Beam indication index value | Number of beams | Beam | Beam one's start time (S) | Beam one's duration | Beam two's start time (S) | Beam two's duration |
|---|---|---|---|---|---|---|
| 00 | 1 | Beam 1 | S1 | T11 | | |
| 01 | 2 | Beam 1 and beam 2 | S12 | T12 | S22 | T22 |
| 10 | 2 | Beam 3 and beam 4 | S13 | T13 | S23 | T23 |
| 11 | 2 | Beam 2 and beam 3 | S14 | T14 | S24 | T24 |

In this example, the number of beams corresponding to different beam indication index values may be one or more. When there are a plurality of beams, the time information of the plurality of beams may be discontinuous in time. For example, the indication value "01" corresponds to beam 1 and beam 2, the start time of beam 1 is S12, the duration of beam 1 is T12, the start time of beam 2 is S22, and the duration of beam 2 is T22. The start time and duration of beam can be indicated by the start and length indicator (SLIV) jointly, or by the start indicator (which is used to determine the start time of the beam) and the length indicator (which is used to determine the duration of the beam) respectively.

Optionally, each of above beams can be limited to one time unit (e.g., time slot), for example, it may be only one beam per time unit, and SLIV indicates the beam start time and beam duration within one time unit. Optionally, each of the above beams may not be limited to one-time unit.

As an optional method, the start time of the beam may also include two pieces of information, one is the start time unit of the beam, and the other is the start position of the beam within the start time unit, for example, the beam indication information (beam indication index value) is transmitted in time unit n, the start time unit of beam 1 indicated by the beam indication information is time unit n+k, and the start position of beam 1 is the 3rd OFDM symbol in time unit n+k, optional, the duration of beam 1 is from the 3rd OFDM symbol in time unit n+k to the 10th OFDM symbol in time unit n+k (optional, when the beam indication information indicates the time length of the beam, the beam indication information may indicate the duration of the beam, such as 8 OFDM symbols in this example, or the beam indication information may indicate the end position of the beam, such as the 10th OFDM symbol in the time unit n+k in this example, or some other forms of information, as long as it is information that can determine the duration of the beam); optionally, the duration of beam 1 can also be from the 3th OFDM symbol in time unit n+k to the 10th OFDM symbol in time unit n+k+m, both k and m are non-negative integers (e.g., k may be 0, 1, 2 or other integers; m may be 0, 1, 2 or other integers). By analogy, it may use this method to obtain the start time and duration of beam 2, beam 3, or the like.

In addition to determining the time information of each of first beams based on the first information (that is, using the first information to jointly indicate the beam and the time information of the beam), the time information of each beam can also be determined based on the acquired third information. The third information may be used to indicate the time information of the at least one first beam, that is, the information for determining the start time and duration of the at least one first beam, and the third information is agreement information or received information. Alternatively, the acquiring the third information includes:

acquiring fourth information and fifth information, where the fourth information is used to determine the start time of the at least one first beam, the fifth information is used to determine the duration of the at least one first beam, and the fourth information is agreement information or received information, and the fifth information is the agreement information or the received information.

That is to say, the start time and the duration of the usage time of a beam can be determined jointly or independently (the method of joint determination or independent determination can also be applied to the determination time information described above option). For the independent determination, the start time and duration of the first beam may be determined based on two independent of fourth information and fifth information.

For the way in which the third information, the fourth information or the fifth information is the agreement information, the above agreement information can be understood as the preset protocol (i.e., the agreement rule), that is, the determination rule for the usage time of the beam is pre-agreed, and the repeater may determine the usage time of the beam by itself according to the agreement rule. For example, the agreement information includes an agreed start time determination rule and an agreed duration, then the agreed duration is the duration of each beam in the at least one first beam, and the repeater can determine the start time of each of first beams according to the start time determination rule.

For an optional manner that the third information, the fourth information, or the fifth information is the received information, and the specific manner of acquiring the third information, the fourth information, or the fifth information is not limited in this embodiment of the disclosure. For example, the repeater may obtain the information by receiving higher layer signaling configuration, or may obtain the information by receiving media access layer signaling or physical layer information (i.e., DCI). The third information, the fourth information or the fifth information may be other information independent of the first information, or may be acquired simultaneously with the first information. For example, the first information may be information contained in the DCI, the DCI information may include the first information and the third information, the repeater may determine at least one first beam based on the first information, and determine time information of each of first beams based on the third information.

It can be understood that, when the first information is one of the at least one first information included in the second information, the second information also includes third information corresponding to each piece of first information. That is, the second information may include information corresponding to at least one second network device, the information includes first information and third information, and the third information may be the first-time indication information described above or second time indication information corresponding to the first network device. Certainly, the third information may also be time indication information independent of the second information, such as the third time indication information or the fourth time indication information in the foregoing.

In an optional embodiment of the disclosure, the first information or the third information may include at least one of a first offset value or first time, and the first offset value is the offset value between the start time of at least one beam in the at least one first beam and the acquisition time of the first information; the first time includes the duration of at least one of the at least one first beam; the above-mentioned determining time information of the at least one first beam may include at least one of the following:

- determining the start time of at least one first beam based on the first offset value and the acquisition time of the first information;
- determining the duration of the at least one first beam based on the first time.

Optionally, the third information may be agreement information, and at least one of the first offset value and the first time may be preset, for example, the first offset is pre-agreed, and the above-mentioned start time determination rule includes a pre-agreed first offset value, the first offset value is the time offset between the start time of the beam and the acquisition time of the first information; if the number of at least one first beam is one, then the repeater may determine the start time of the first beam based on the acquisition time of the first information and the offset value when the repeater acquires the first information. For another example, the at least one first beam is two beams with continuous usage time, and the offset value may be the time offset between the start time of the first beam among the two beams and the acquisition time of the first information; after determining the start time of the first beam according to the above offset value, the repeater may determine the start time of the second beam according to the duration of the first beam. If the third information is received information, the third information can be configured through higher layer signaling, media access layer signaling or physical layer signaling, and at least one of the start time and duration of the at least one first beam are configured through the third information.

Optionally, when the first information is the first information corresponding to the current first network device determined from the second information, the acquisition time of the first information may refer to the acquisition time of the second information.

In an optional embodiment of the disclosure, the time information of each beam in the at least one first beam is continuous in time.

The determining the usage time of the at least one first beam includes:

- determining the start time of at least one beam of the at least one first beam, and the duration of each of first beams;
- obtaining the usage time of each of first beams according to the determined start time of at least one beam and the duration of each of first beams, and the usage time of one beam including the start time and the timing time of the beam.

It can be seen from the foregoing description that at least one beam corresponding to a repeater may be continuous in usage time, or may be discontinuous in usage time. For the implementation of being continuous in usage time, when determining the usage time of at least one first beam, the information for determining the usage time (such as the first information, the third information, etc.) may include the start time of one or more beams in the at least one first beam (or the information for determining the start time, such as the offset value described above), and the duration of each of first beams (certainly, if the duration of each of first beams is the same, it may also include the duration of only one beam). For example, it may include the start time of a first one of the first beams and the duration of each of first beams. Since the usage time of each of first beams is continuous, then it may determine the start time of the second first beam according to the start time and duration of the first one of first beams. Similarly, according to the start time and duration of a second one of first beams, it may determine the start time of a third one of first beams, and so on. It may obtain the usage time of each of first beams.

It can be understood that the above-mentioned optional embodiments provided in this application may be implemented independently, and different embodiments may also be combined if there is no contradiction among the embodiments.

In an optional embodiment of the disclosure, the method further includes:

acquiring sixth information, where the sixth information is used to configure at least one second beam for transmitting information; and determining at least one second beam based on the sixth information to transmit information through each of second beams.

Optionally, the at least one second beam includes at least one first beam, that is, the at least one first beam may be determined from the at least one second beam.

In this optional solution, the second beam may be a beam for beam measurement. It can be understood that, for the repeater, the repeater is used to forward data and/or control information, and the repeater does not know what information to be transmitted, and the repeater only needs to know what information it may use. That is, the repeater can determine which second beam it may use to transmit information according to the received sixth information.

Based on this optional solution, the repeater may determine one or more second beams that it may use by receiving the sixth information, and after receiving the information (data and/or control information) that needs to be transmitted to the UE, the repeater may use the second beam to transmit information to the UE. Optionally, the UE may receive relevant information from the base station for instructing it to perform beam measurement on the second beam, the UE performs beam measurement based on the received information, and feeds back the measurement result to the base station, and the base station may measure the beam based on the beam measurement fed back by the UE, determine which second beam or beams are used as the first beam, so that the requirements for beam measurement may be met, and the transmission performance of the subsequent repeater for transmitting information through the first beam is improved.

The specific form of the contents included in the sixth information is not limited in the embodiment of the disclosure. For example, it may include a beam indication value or directly indicate a beam identifier, and the repeater may determine which or several second beams are presented according to the indication information, and transmit the information through the determined second beam.

The above at least one second beam is a transmitting beam, that is, a beam used by the repeater for transmitting information to the UE. Optionally, the sixth information may further include information for indicating whether each of second beams is a transmitting beam or a receiving beam.

Optionally, the acquiring sixth information may include: receiving a second signaling, which carries a sixth information.

The second signaling includes at least one of higher layer signaling, media access layer signaling, or physical layer signaling.

For the specific description of the second signaling, please refer to the relevant description of the first signaling in the foregoing. If the actual implementation is not logical, the description of the first signaling in the foregoing may also be applicable to the second signaling.

In an optional embodiment of the disclosure, the at least one second beam may be used periodically, and the sixth information is further used to configure a usage period of the at least one second beam and time information of each of second beams.

The determining the at least one second beam based on the sixth information to transmit information through each of second beams, includes:

determining at least one second beam, a usage period of the at least one second beam, and the usage time of each of second beams according to the sixth information;

transmitting information through periodically using respective second beams based on each of the second beams and the usage time of the second beam.

That is to say, the sixth information may also be used to configure time information of each of second beams, in addition to indicating at least one second beam to the repeater. The repeater can determine each of second beams according to the time information of each of second beams, and transmit information at the usage time corresponding to each of second beams. The at least one second beam may also be used periodically, and the sixth information may also indicate the duration of the period, that is, the above-mentioned usage period. The repeater may periodically transmit information at the usage time corresponding to respective second beams according to the usage period. For example, the usage period is P, and the repeater transmits information by using each of second beams every period P.

The indication manner of the usage period and the indication manner of the usage time of each of second beams are not limited in the embodiments of the disclosure. For example, the usage period may be actual duration information, such as 1 second, or may be a relative duration, for example, which can be indicated in the form of time units. For example, the usage period is several time units, and one-time unit may be one time slot, one OFDM symbol, or one frame, and so on. The usage time of each of second beams may include, but not limited to, the manner described above for realizing the indication of the usage time of the first beam. For example, the time information of one beam may be an offset value, and the offset value may be the time offset of the beam corresponding to the start time of each period. In each period, the start time of the beam can be determined according to the start time of the period and the offset value, and the duration of the beam may be a pre-agreed value, or may be duration information indicated by the sixth information.

Optionally, the time information of each of second beams in the above-mentioned at least one second beam may be continuous in time, then the information for determining the usage time of each of second beams (which may be the sixth information, or may be other information independent of the sixth information) may include information indicating the start time of the first beam in the at least one second beam and information indicating the duration of each of second beams. If the duration of each of second beams is the same, the information for determining the time information of each of second beams may also include information configuring the start time and the duration of the first beam in the at least one second beam.

In an optional embodiment of the disclosure, the method further includes:

determining the usage time of the at least one first beam.

If overlapping time is presented between the usage time of at least one first beam and the usage time of at least one second beam, for the first beam and the second beam having the overlapping time, the method may further include at least one of the followings:

Manner 1: transmitting information based on the first beam and the usage time of the first beam, and not transmitting information on the at least one second beam during the current period;

Manner 2: transmitting information based on the at least one second beam and the usage time of each second beam, and not transmitting information on the first beam during the current period;

Manner 3: transmitting information based on the at least one second beam and the usage time of respective second beams, and transmitting information based on the first beam and non-overlapping time of the first beam during the current period, where the non-overlapping time is time of the usage time of the first beam except for the overlapping time;

Manner 4: transmitting information based on the first beam and the usage time of the first beam, and transmitting information based on the at least one second beam and the usage time of respective second beams.

For the situation that the time information of the first beam and the usage time of the second beam may be overlapped, the solution of the disclosure provides several optional implementations. It can be understood that the above-mentioned transmission of information based on the first beam and the usage time of the first beam refers to transmitting or receiving data and/or control information during the usage time of the first beam; the transmission of information based on the second beam and the usage time of the second beam refers to transmitting information at the usage time of the second beam.

When at least one first beam configured by the first information are more than one, the transmitting information based on the first beam and the usage time of the first beam described in the above manners 1 to 4 refers to transmitting information based on the first beam which has an overlapping time with the second beam.

Based on manner 1, when the first beam and the second beam overlap with each other in time, the first beam is preferentially used, which can better meet the requirements for data and/or control information transmission. Based on the manner 2, the second beam is preferentially used, which can better meet the requirements of beam measurement. Based on the manner 3, the requirements for data and/or control information transmission can be met as much as possible on the premise of avoiding interference between the first beam information transmission and the second beam information transmission. Based on the manner 4, the repeater does not need to judge whether the usage time of the first beam and the usage time of the second beam overlap with each other, and the information transmission of the first beam and the second beam can be carried out normally. Optionally, for the manner 4, it may be achieved by the base station that at least one first beam and at least one second beam overlap with each other in time, the first beam and second beam having time overlapping can be the same beam, for example, the first beam a is the same beam as the second beam b, and the information corresponding to the first beam and the information corresponding to the second beam can be simultaneously transmitted within the usage time of the beam.

Optionally, if the time overlapping is presented between a first beam a and one or more beams b in the at least one second beam, in each optional manner of the solution, no information is transmitted on the second beam, which may refer that no information is transmitted on the second beam that overlaps with the beam a in time, or no information is transmitted on all the second beams.

As another optional implementation, the base station may also instruct the repeater to adopt which of the foregoing multiple manners. For example, the repeater may receive indication information, which is used to indicate the target processing manner adopted by the repeater, that is, the processing manner when the time information of the first beam and the time information of the second beam overlap with each other.

Optionally, the second beam may also be used aperiodically.

It should be noted that, in the various optional solutions provided by this application, the base station can flexibly configure the transmitting beam used by the repeater for transmitting information, the receiving beam for receiving information, whether the beam is a transmitting beam or a receiving beam, and one or more of the usage times of each of the configured beams. The repeater can determine one or more of the beams used by itself for transmitting information, the beams for receiving information, and the time information of each beam according to the relevant information transmitted by the base station. The specific manner in which the base station implements the above configuration is not limited in this embodiment of the disclosure, which may be indicated in the information transmitted by the base station to the repeater, or may be a manner agreed upon in an agreement, or may be agreed upon according to the information transmitted by the base station and the agreement information is jointly determined. The above-mentioned multiple pieces of information may be indicated or determined individually for each item, or may be indicated or determined jointly.

In order to better understand and illustrate the solutions provided by the embodiments of the disclosure, the solutions of the disclosure will be described in more detail below with reference to several optional embodiments. It should be noted that, in the following embodiments, a combination of one or more optional embodiments provided in the foregoing application may be included. However, this combination should not be construed as a limitation on the implementation of the solution of the disclosure, and each optional implementation may be implemented alone or in combination with one or more other optional implementations.

In the embodiments provided in this application, the repeater may not know the specific content of the information to be transmitted and/or received by the repeater. Through the implementations provided by the disclosure, the repeater can determine which beam or beams may be used to transmit and/or receive information, and may determine time information for each beam.

Embodiment 1

This embodiment provides an optional solution for determining at least one first beam (which may also be referred to as a repeater beam) corresponding to the repeater.

The repeater may determine, by receiving the first signaling, a transmitting beam on which the repeater transmits information (data and/or control information) to the UE and/or a receiving beam on which the repeater receives information transmitted by the UE, where the transmitting beam and/or the receiving beam are first beam. The first signaling may be higher layer signaling, media access layer signaling, or physical layer signaling (i.e., DCI), and the physical layer signaling is used as an example for description in this embodiment.

DCI can be transmitted in a repeater-specific search space (UE-specific Search), and this method can inform a repeater's transmitting beam and/or repeater's receiving beam in one DCI.

The repeater beam indication channel (that is, the channel for transmitting the first signaling) may carry UE-specific DCI, the repeater may receive the information of this DCI, and then the repeater determines its own transmitting and receiving beams according to the information in the DCI. The beam indication information in DCI can be L bits (L is a positive integer, the value of L is preset by the protocol, or configured by higher layer signaling, or determined by the number B of beams to be indicated (that is, the number of first beams), for example, L=⌊log 2 (B)⌉, that is, round up log 2 (B) to get L.

DCI can also be transmitted in a common search space. Using this method, more than one transmitting beam and/or receiving beam of repeater can be notified in one DCI, which can save resources occupied by DCI.

An optional beam indication method (this beam can be the transmitting beam of the repeater or the receiving beam of the repeater) is as follows: there are M pieces of information within a repeater beam indication channel (i.e., DCI)), that is, the second information includes M pieces of first information, where M is a positive integer, preset by the protocol, or configured by higher layer signaling, for example, M is equal to 1, and each piece of information has L bits of information (L is a positive integer, and the value of L is determined by the preset protocol, or configured by higher layer signaling, or determined by the number of beams to be indicated B), and each piece of information indicates each repeater beam.

Figure 7A:
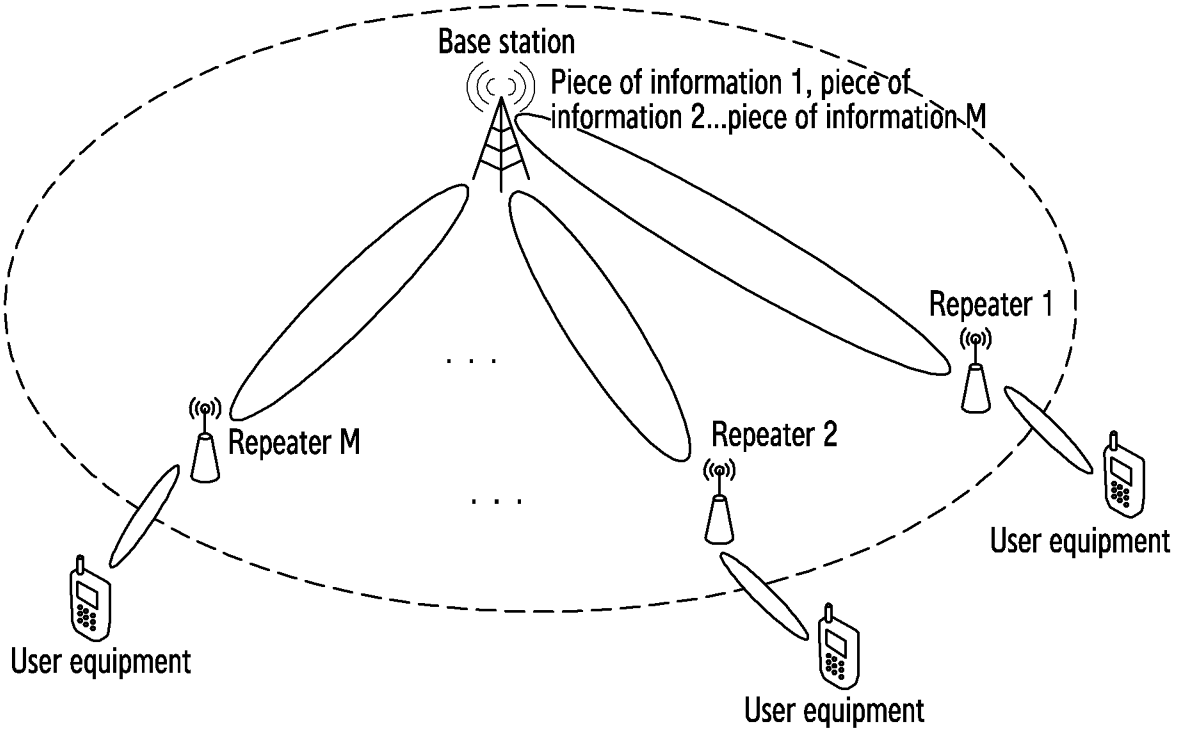
FIG. 7A is a schematic diagram of an information transmission mode according to an embodiment of the disclosure.

FIG. 7A is a schematic diagram of an information transmission mode according to an embodiment of the disclosure.

FIGS. 7B, 7C, 7D, and 7E are schematic diagrams of several determining beams and usage time of beams according to various embodiments of the disclosure.

Referring to FIG. 7A, the repeater beam indicates that there are M pieces of information in the channel (piece of information 1, piece of information 2 . . . piece of information M shown in the figure, that is, M pieces of first information). The M pieces of information correspond to the M repeaters one by one. The first piece of information (e.g., piece of information 1) of the M pieces of information indicates the beam of repeater 1, and the second piece of information (e.g., piece of information 2) indicates the beam of repeater 2, and so on, the $M^{th}$ piece of information (e.g., piece of information M) in the beam indication channel indicates the beam of repeater M.

The repeater beam indication channel can be a group-common DCI, a group of repeaters can receive the information of this DCI, and then each repeater determines its own transmitting and receiving beams according to the corresponding piece of information in the DCI. As above, the M repeaters are a group of repeaters. The mapping relationship (an optional solution of the first mapping relationship) between each piece of information indication information (that is, the content of the piece of information) and each repeater can be configured by higher layer signaling, indicated by system information, or obtained by implicit manner.

For example, the above L is equal to 2, and the corresponding relationship between the beam indication information and the beam may be as shown in Table 1 above.

Embodiment 2

This embodiment provides an optional solution for determining time information of at least one first beam corresponding to the repeater.

The above embodiment describes the method for indicating the repeater beam. Optionally, the start and end time (that is, the usage time) of the repeater beam can also be determined. A method for determining the start and end time of the repeater beam is to determine the start time(S) and duration (T) of the beam. The following optional implementations are provided in this embodiment.

In this embodiment, the indication mode of the first beam (i.e., the first signaling) is still described by taking the physical layer signaling indicating the beam as an example. It can be understood that the above-mentioned beam indication mode can also be extended to application higher layer signaling or media access layer signaling indication.

Manner 1:

In this manner, when the base station simultaneously indicates the beam used by at least one repeater (that is, the second information includes at least one first information), a manner of determining the corresponding usage time of each repeater is provided. The beam and the usage time of the beam can be indicated jointly (the scheme shown in FIGS. 7A to 7C), or can be indicated separately (the scheme shown in FIG. 7D).

As an optional manner, each piece of the first information included in the second information is not only used to configure the beam used by each repeater, but also used to configure the usage time of the beam. Still taking FIG. 7A as an example, the second information includes M pieces of information, and the M pieces of information correspond to the M repeaters one by one, and the first piece of information (such as piece of information 1) of the M pieces of information can be used for indicating the beam and beam usage time of repeater 1, the second piece of information (such as piece of information 2) indicates the beam and beam usage time of repeater 2, and so on, the $M^{th}$ piece of information (such as piece of information M) indicates the beam of repeater M.

Figure 7B:
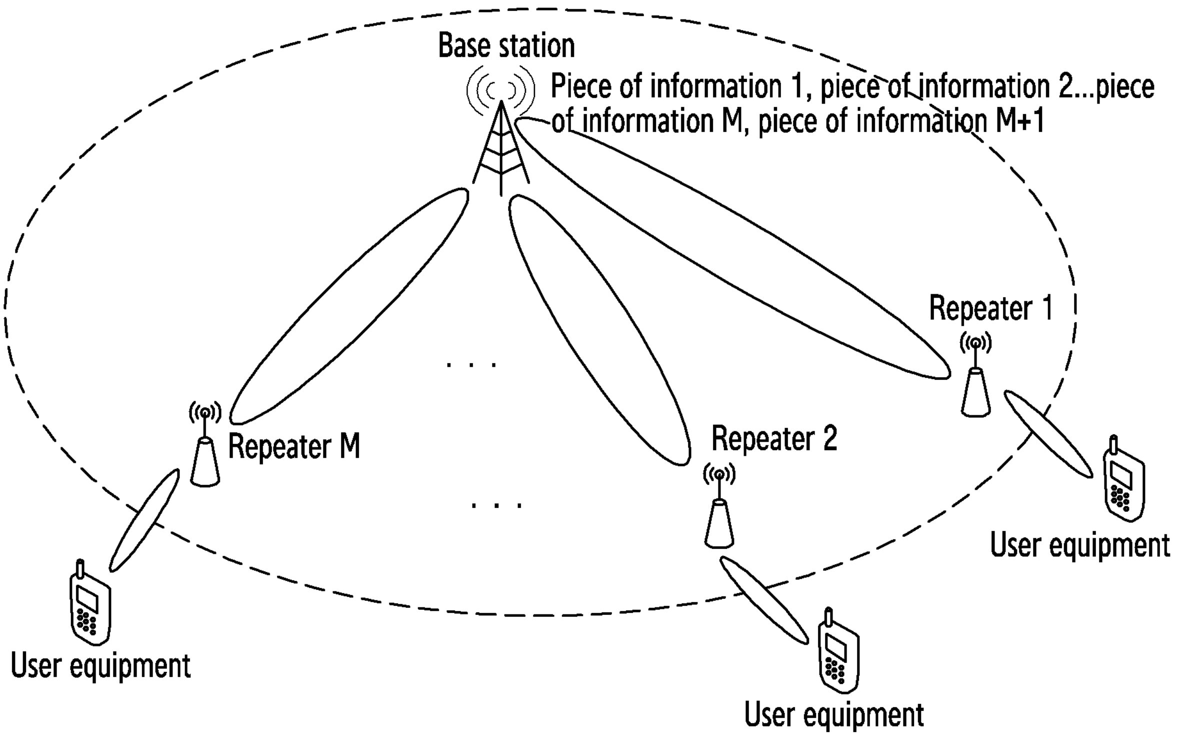
FIGS. 7B, 7C, 7D, and 7E are schematic diagrams of several determining beams and usage time of beams according to various embodiments of the disclosure.

As another optional manner, referring to FIG. 7B, the second information includes M pieces of first information and a piece of time indication information (i.e., first time indication information), and the M pieces of first information are respectively used to indicate beams used by M of repeaters, and the first time indication information is used to determine the usage time of the beams of the M repeaters.

Figure 7C:
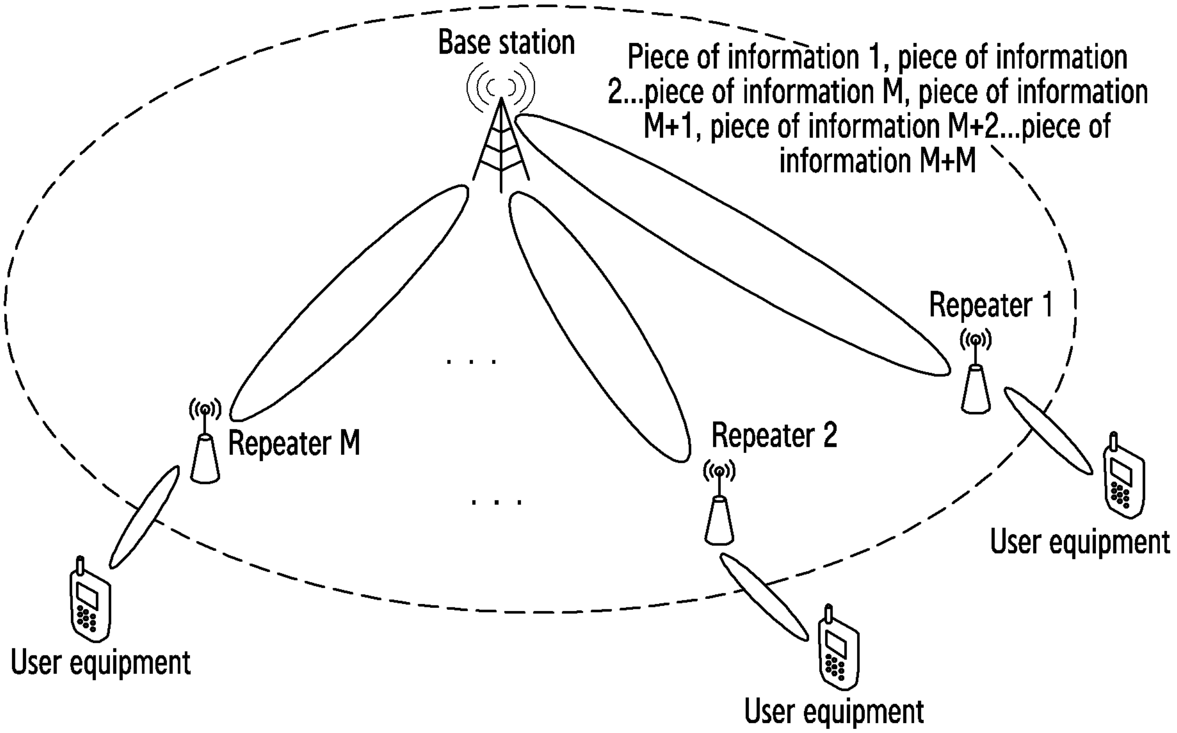

As another optional manner, referring to FIG. 7C, the second information includes M pieces of first information and M pieces of time indication information (i.e., second time indication information), and the M pieces of first information are respectively used to indicate beams used by M of repeaters, and each of second time indication information is used to determine the usage time of the beam of a repeater. For example, the first piece of information (piece of information 1) is used to indicate the beam of repeater 1, the M+1th piece of information (piece of information M+1) is used to determine the usage time of the beam of repeater 1, and the second piece of information (piece of information 2) indicates the beam of repeater 2, the M+2th piece of information (piece of information M+2) is used to determine the usage time of the beam of repeater 2, and so on.

Figure 7D:
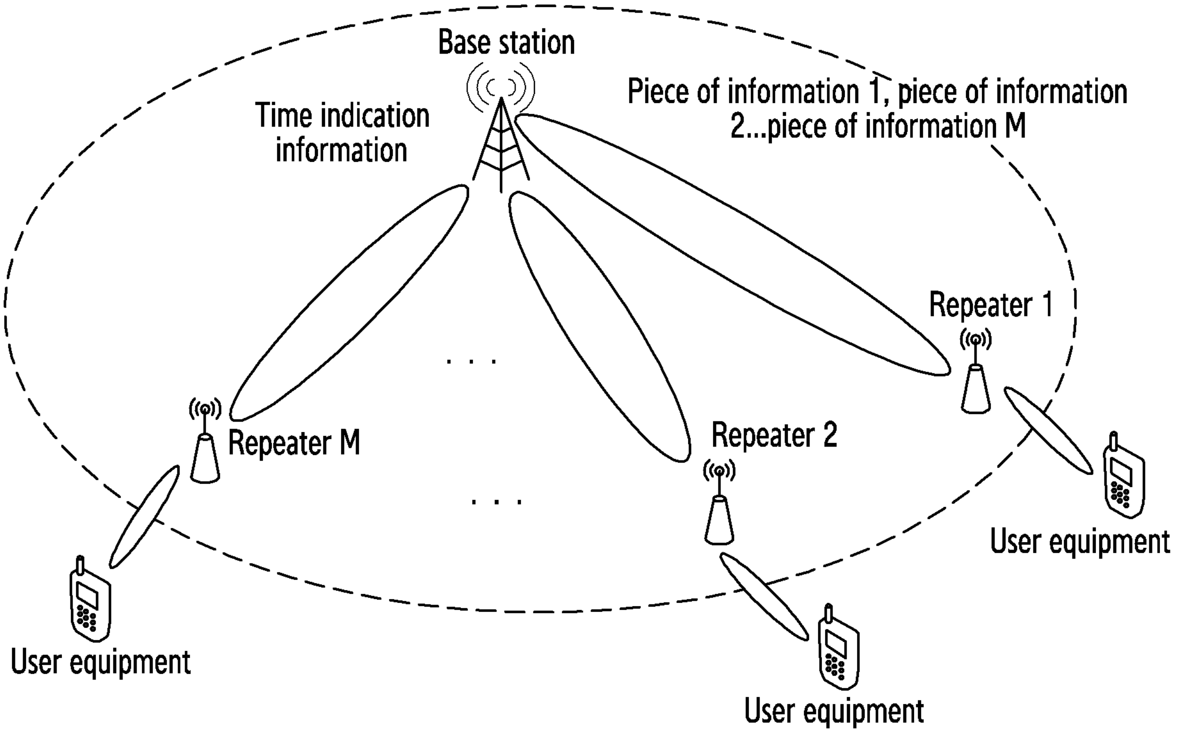

As another optional manner, referring to FIG. 7D, the second information includes M pieces of first information, and a piece of first information is used to configure a beam used by a repeater. The repeater can also obtain time indication information that is independent of the second information (i.e., the third time indication information in the foregoing). After each repeater receives the second information, it may determine corresponding beam according to the first information corresponding to itself in the second information; and after the repeater obtains the third time indication information, it may determine the usage time of the beam according to the indication information.

Figure 7E:
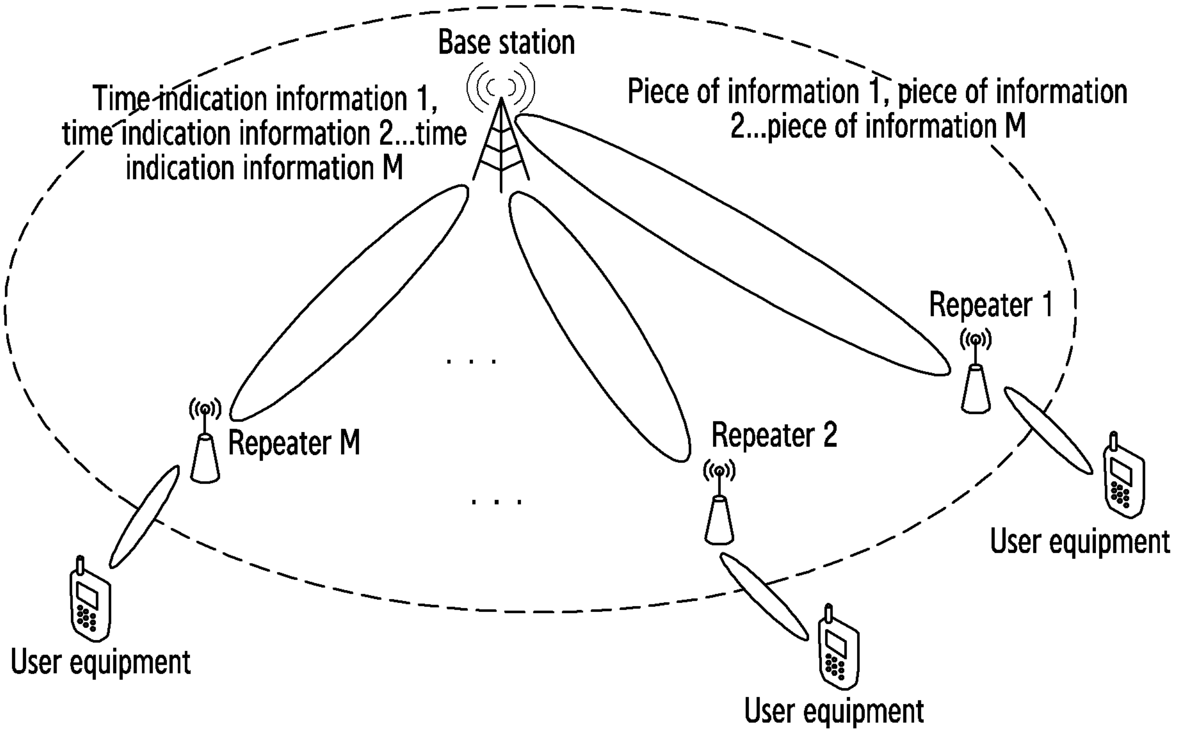

As another optional method, referring to FIG. 7E, the second information includes M pieces of first information. After acquiring the second information, the repeater can determine the corresponding beam according to the first information corresponding to itself in the second information. The repeater may also obtain time configuration information independent of the second information, and the time configuration information includes M pieces of fourth time indication information (referring to FIG. 7E, time indication information 1, time indication information 2, . . . , time indication information M); after the repeater receives the time configuration information, it can determine its corresponding fourth time indication information from M of fourth time configuration information, and determine the usage time of beam used by itself according to the determined indication information.

As yet another optional manner, the usage times of the beams corresponding to the M repeaters may be determined according to a rule agreed upon in the protocol. For example, the beams corresponding to the M repeaters may have the same usage time, the start time of the beam agreed in the protocol is the acquisition time of the second information plus the agreed time offset value, and the duration of the beam is an agreed duration.

Manner 2:

The start time(S) and duration (T) of the indicated beam usage can be determined independently of the indicated beam.

Optionally, the start time(S) of the beam usage can be determined through an offset value (i.e., the first offset value) between the physical downlink control channel (PDCCH) indicated by the beam of the repeater (that is, the acquisition time of the above-mentioned DCI, which can be understood as the time domain resource information for transmitting the DCI, such as in which time slot or OFDM symbol). The offset value may be in units of OFDM symbols or time slots. The offset value can be preset by the protocol. The offset value can also be determined by the repeater receiving higher layer signaling configuration. The offset value can also be determined by the repeater, and can be determined by receiving media access layer signaling, and the offset value can also be determined by physical layer signaling.

The duration (T) used by the beam can also be in units of OFDM symbols or time slots. The duration (T) can be preset by the protocol, or determined by the repeater receiving higher layer signaling configuration, or determined by the repeater receiving media access layer signaling, and can also be determined by physical layer signaling.

Figure 8:
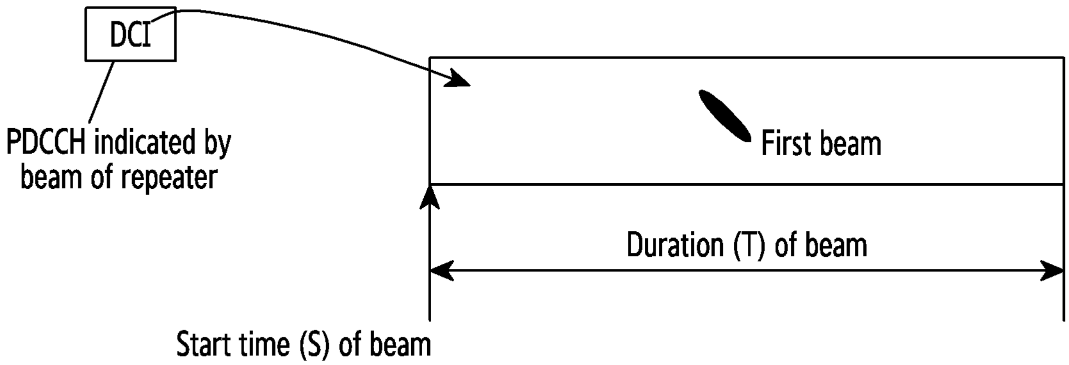
FIG. 8 is a schematic diagram of a principle for determining time information of a beam according to an embodiment of the disclosure.

FIG. 8 is a schematic diagram of a principle for determining time information of a beam according to an embodiment of the disclosure.

Referring to FIG. 8, it is assumed that the DCI used to indicate the first beam is transmitted in the nth OFDM symbol (acquisition time) of a time slot, that is, the PDCCH that transmits the repeater beam indication information (the PDCCH indicated by the repeater beam shown in figure) is in the nth OFDM symbol, and the above offset value is m of OFDM symbols, then the start time(S) of the first beam is the $(n+m)^{th}$ OFDM symbol, and the timing time of the beam may be preset or determined through information carried in the signaling.

Optionally, the start time(S) and duration (T) of beam usage may be indicated jointly. For example, as shown in Table 2 above, a beam time indication index value (i.e., the second indication value) corresponds to one start time(S) and one duration (T), the repeater determines the start time and duration of the first beam according to the acquired second indication value. Using this method, it may save the indicated number of bits of information. It should be noted that, in actual implementation, the start time(S) may be specific time, or may be the above-mentioned offset value for determining the start time.

Manner 3:

The start time(S) and duration (T) of the indicated beam usage are determined jointly with the indicated beam.

An indication method may indicate the start time(S) and duration (T) of the beam and beam usage respectively for different fields in one DCI, for example, field A includes L1 bits to indicate beams, and field B includes L2 bits to indicate the start time(S) and duration (T) of beam usage. By adopting this method, one DCI can be used to indicate both the beam and the start and end times of the beam, which may save the resources occupied by the PDCCH.

Another indication method may indicate M beams (that is, at least one first beam is two of first beams) and the start time and duration of use of each beam for fields in one DCI.

Figure 9:
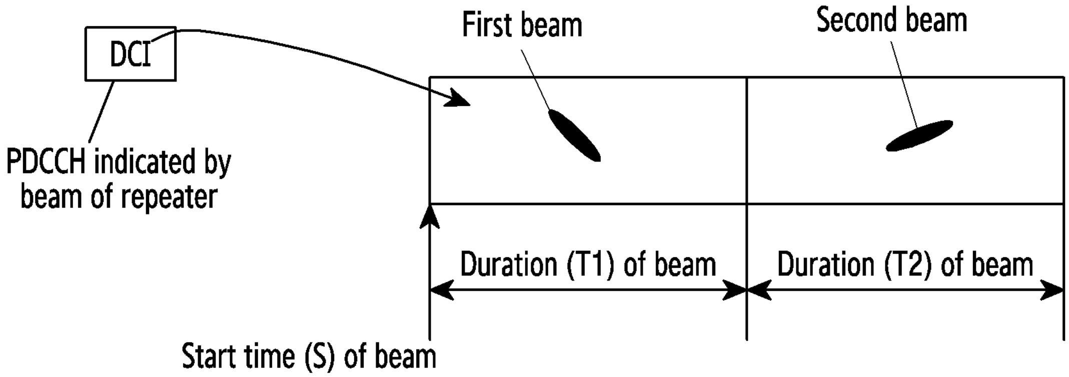
FIG. 9 is a schematic diagram of a principle for determining time information of a beam according to an embodiment of the disclosure.

FIG. 9 is a schematic diagram of a principle for determining time information of a beam according to an embodiment of the disclosure.

Referring to FIG. 9, M is equal to 2, and the usage times of the 2 beams (the first beam and the second beam shown in the figure) are consecutive, and the durations of the first beam and the second beam are T1 and T2, respectively, and the end time of the first beam is the start time of the second beam. The fields of DCI may include indication information of the start time S of the first beam (such as the offset value corresponding to the start time of the first beam), the duration T1 of the first beam and the duration T2 of the second beam; the repeater can determine the start time S of one beam according to the indication information of the starting of the first beam, and determine the start time S of the second beam according to the start time S and duration T1 of the first beam time.

Another optional indication method may include: determining a beam indication index value, the number of beams (optional), each beam, and the corresponding relationship between the start time and duration of each beam (optional solution for the first mapping relationship), and then the repeater indicates the number of acquisition beams, each of first beams, and the start time and duration of each beam by receiving the index value (i.e., the first indication value), as shown in the example shown in Table 4-1 above.

Another optional indication method may include: determining a beam indication index value, the number of beams (optional), each beam, and the corresponding relationship between the start time and duration of each beam (optional solution for the first mapping relationship), and then the repeater indicates the number of acquisition beams, each of first beams, and the start time and duration of each beam by receiving the index value (i.e., the first indication value), as shown in the example in Table 4-2 above.

Embodiment 3

In this embodiment, the repeater may determine a transmitting beam used by the repeater for transmitting information to the UE and/or a receiving beam used by the repeater for receiving information from the UE by receiving the second signaling (which includes the sixth information) transmitted by the base station.

The second signaling may be higher layer signaling, media access layer signaling or physical layer signaling.

The beams indicated by the second signaling may be used periodically. Optionally, the number of beams in each period may be the same, the start and end times of each beam may be the same, and the beams at the same time position are the same. For example, the period of the beam is P, and in each period P, there are S beams (that is, S second beams) for transmission, and the S beams can be continuously transmitted, and the total duration of the S beams is T, and the S beams are transmitted continuously. The duration of each of the beams can be T1, T2 . . . . TS, respectively. Certainly, the S beams may also be discontinuous, and the start time and duration of each beam may be indicated through the second signaling.

Figure 10:
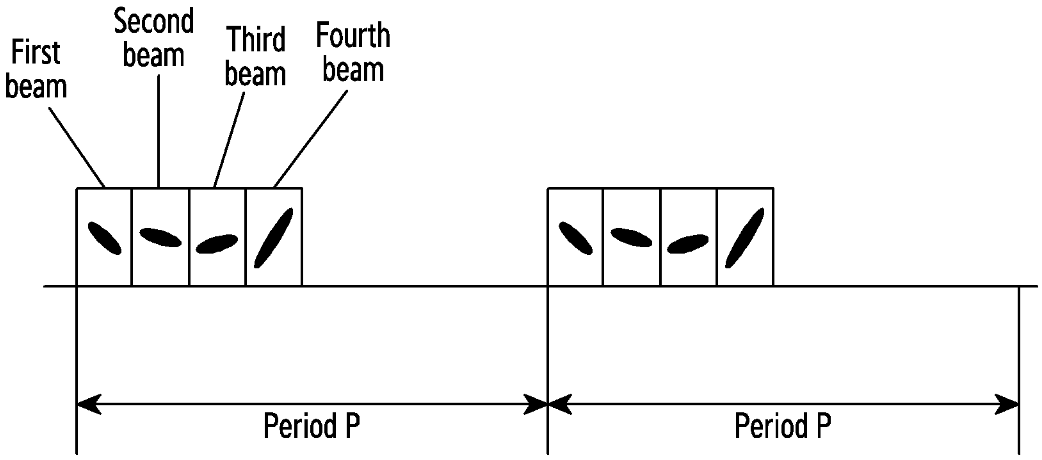
FIG. 10 is a schematic diagram of a second beam according to an embodiment of the disclosure.

FIG. 10 is a schematic diagram of a second beam according to an embodiment of the disclosure.

Referring to FIG. 10, S is 4, that is, the number of at least one second beam is 4, which are the first beam to the fourth beam shown in the figure, and the usage time of these 4 beams is continuous. Optionally, the second signaling may include the indication information of the 4 beams, the indication information of the start time of the first beam in the 4 beams, and the respective durations of the 4 beams. If the durations of the four beams are the same, so the second signaling may also include the indication information of the start time of the first beam and the total duration of the four beams. The repeater can determine which beams the 4 beams are and the time information of each beam according to the second signaling, and transmit the information corresponding to the beam through each beam within the usage time of the beam.

The advantage of using this method is that it can provide a measurement signal (configuration information) for the UE measuring the transmission performance of each beam, and then feeds back the measurement result to the base station, and the measurement result can be used by the base station as the basis for determining the beam of the repeater.

Embodiment 4

In this embodiment, a method is provided for dealing with inconsistency between the beam determined by the first signaling and the beam determined by the second signaling, that is, which is a processing method when the beam determined by the first signaling and the beam determined by the second signaling overlap in time.

Figure 11:
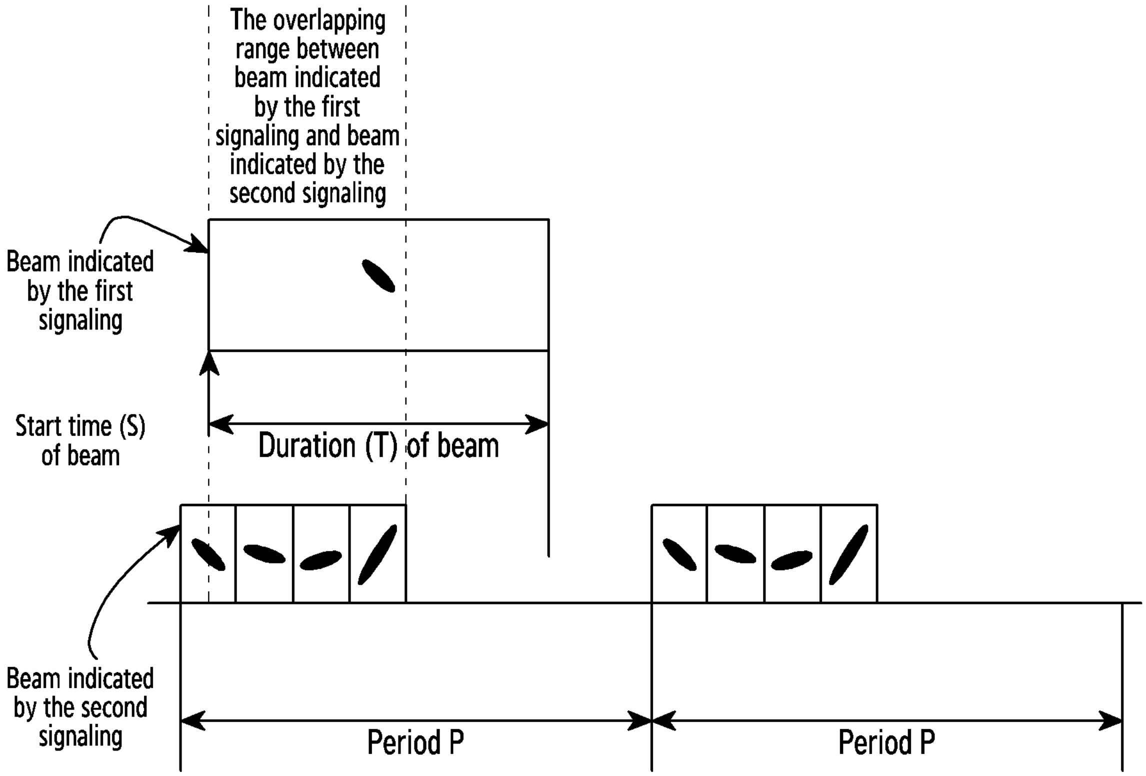
FIG. 11 is a schematic diagram of overlapping time being presented between the usage time of a first beam and the usage time of a second beam according to an embodiment of the disclosure.

FIG. 11 is a schematic diagram of overlapping time being presented between the usage time of a first beam and the usage time of a second beam according to an embodiment of the disclosure.

Referring to FIG. 11, when the usage range of the beam indicated by the first signaling (i.e., the first beam) and that of the beam indicated by the second signaling (i.e., the second beam) overlap in time, the second signaling indicates 4 of second beams, these 4 of beams are used periodically. The first signaling indicates a first beam, the start time of the beam is S, and the duration of the beam is T, as shown in the figure, the usage time of the first beam (that is, the time from S to S+T) overlaps with the usage time of the 4 of second beams in a period P (the overlapping time is the overlapping range between the two dashed lines shown in FIG. 11). In this case, several optional processing methods are provided in this embodiment.

An optional method is: through the implementation of the base station, the beam indicated by the first signaling and the beam indicated by the second signaling are the same in the overlapping time, where the overlapping time is the time the beam indicated by the first signaling and the beam indicated by the second signaling overlap in time. The advantage of this method is that the protocol is simple and can be controlled by the base station. Even if the time overlaps with each other, the repeater can transmit the data and/or control signaling corresponding to the first beam, and can also transmit information corresponding to the second beam.

Another optional method is: not constrain the beam indicated by the first signaling and the beam indicated by the second signaling to be the same in the overlapping time. In this optional method, if the beam indicated by the first signaling and the beam indicated by the second signaling overlap in time, and the overlapping portion between the beam indicated by the first signaling and the beam indicated by the second signaling are not the same, one of the beam indicated by the first signaling and the beam indicated by the second signaling may be determined as the beam used by the repeater, that is, the repeater may only use the beam indicated by the first signaling to transmit the corresponding information.

If in the time overlapping portion between the beam indicated by the first signaling and the beam indicated by the second signaling, the beam indicated by the first signaling and the beam indicated by the second signaling are different, an optional processing method include: determining the beam indicated by the first signaling as the beam used by the repeater, that is, the repeater does not use the beam indicated by the second signaling, the advantage of using this method is that the beam requirements for data and/or control information transmission can be preferentially met. Another optional processing method is to determine the beam indicated by the second signaling as the beam used by the repeater. The advantage of using this method is that the beam requirement for beam measurement can be preferentially met.

Embodiment 5

This embodiment provides a solution that can jointly instruct the receiving beam of the repeater and the transmitting beam of the repeater, that is, at least one first beam includes at least one transmitting beam used by the repeater for transmitting information (data and/or control information) to the UE, and at least one receiving beam used by the repeater for receiving information transmitted by the UE.

This solution can be adopted when the relative positions of the UE and the repeater are fixed, and the method of determining the relative positions to be fixed is not limited in this embodiment of the disclosure. Alternatively, the base station may determine the UE and repeater are relatively fixed with respect to each other based on preset judgement strategy. For the UE and the repeater satisfying the above-mentioned fixed relative positions, the receiving beam and the transmitting beam of the repeater may be associated with each other, and therefore, the receiving beam and the transmitting beam of the repeater may be indicated jointly. The advantage of using this method is that the beam indication information can be saved, and since the relative position relationship between the UE and the repeater is stable, the performance of the transmitting beam and the receiving beam of repeater indicated by the joint indication method will not be significantly reduced. It will not affect the user's perception.

In actual implementation, if the correlation between the transmitting beam and the receiving beam is relatively poor (the relative position relationship between the UE and the repeater fluctuates greatly), the receiving beam and the transmitting beam of the repeater can also be independently instructed, that is, the beam for transmitting information and the beam for receiving information may be indicated separately. For example, it can be determined through higher layer signaling configuration to independently indicate the receiving beam of the repeater and the transmitting beam of the repeater or jointly indicate the receiving beam of the repeater and the transmitting beam of the repeater. It may select an appropriate indication method according to the degree of correlation between the receiving beam of the repeater and the transmitting beam of the repeater.

As an example, Table 5 illustrates an optional form of jointly indicating the receiving beam of the repeater and the transmitting beam of the repeater. As shown in Table 5, one beam indication index value (i.e., the first indication value) corresponds to a receiving beam and a transmitting beam; for the duration of the beam, if the repeater receives data and control signaling (i.e. control information), it may use the indicated receiving beam to receive data and control signaling; if the repeater transmits data and control signaling, it may use the indicated transmitting beam to transmit data and control signaling. For example, if the indication value carried in the first information is “00”, the repeater can receive data and/or control signaling transmitted by the UE within the usage time of beam J1, and can transmit data and/or control signaling to the UE within the usage time of beam F1.

Table 5: corresponding relationship between beam indication index value and transmitting beam and receiving beam

TABLE 5

| Beam indication index value | Transmitting beam | Receiving beam |
|---|---|---|
| 00 | F1 | J1 |
| 01 | F2 | J2 |
| 10 | F3 | J3 |
| 11 | F4 | J4 |

Optionally, the usage times of the jointly indicated transmitting beam and receiving beam may be continuous in time.

Figure 12:
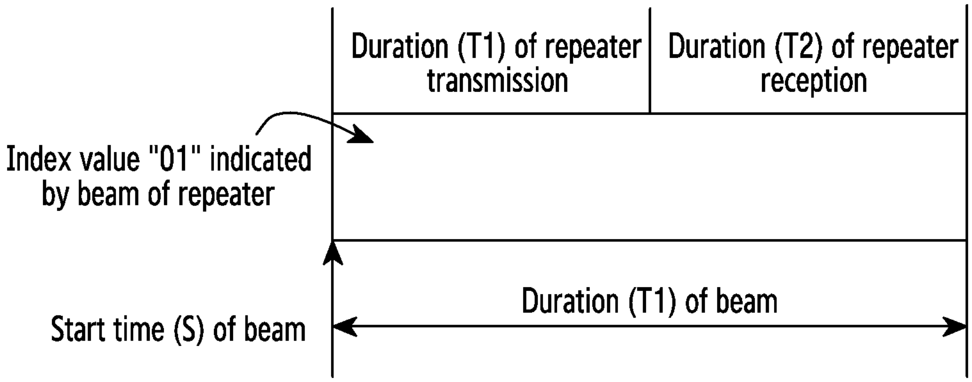
FIG. 12 is a schematic diagram of conjunctionally indicating a transmitting beam and a receiving beam according to an embodiment of the disclosure.

FIG. 12 is a schematic diagram of conjunctionally indicating a transmitting beam and a receiving beam according to an embodiment of the disclosure.

Referring to FIG. 12, the beam indication index value indicated in the first information is “01”, and the start time of indicated beam is S, and the duration of indicated beam is T. According to the index value “01” and the above corresponding relationship, it can be determined that the transmitting beam of the repeater is F2, the receiving beam is J2, and the transmitting beam F2 is the earlier used beam. Optional, if the durations of the receiving beam and the transmitting beam are the same, the start time and duration of the two beams can be determined according to the start time S and the total time T, respectively. If the receiving beam and transmitting beam have the same duration, the start time of the receiving beam may be determined according to the duration T1 of the transmitting beam, and the indication of the duration T1 of the transmitting beam may be determined in the first information or by other optional methods. During T1 within beam duration T, the repeater uses transmitting beam F2 to transmit data and/or control signaling, and during T2 within beam duration T, the repeater uses receiving beam J2 to receive data and/or control signaling.

By using the solutions provided by the embodiments of the disclosure, the performance of information transmission (including transmitting and receiving) in a communication system can be effectively improved.

In the foregoing multiple optional embodiments, an optional implementation of the method provided by the disclosure is described with the repeater as the execution subject. The method provided by the embodiment of the disclosure will be described below using the base station as the execution subject.

Taking the base station as the execution subject, the communication method provided by the embodiment of the disclosure may include:

transmitting first information, where the first information is used to configure at least one first beam used by the first network device for transmitting information.

The first network device may be any information forwarding device in the communication system, that is, a device for forwarding information between the base station and the UE, and may be referred to as a repeater, a relay or other names.

The base station may flexibly configure the beam of the repeater for transmitting and/or receiving information (data and/or control information) by transmitting the first information. The repeater can determine the beam used by itself according to the first information. Optionally, the repeater may also determine the time information of the beam used by the repeater, and it may refer to the relevant descriptions in the foregoing embodiments.

Optionally, the above-mentioned transmitting the first information includes:

transmitting second information, where the second information includes at least one piece of first information, the second information corresponds to a group of network devices, and a piece of first information is used to determine the information used by a network device corresponding to the first information among a group of network devices for transmitting information beam.

Optionally, each piece of first information included in the second information is further used to determine the usage time of the beam used by the network device corresponding to the first information.

Optionally, the second information further includes first time indication information, where the first-time indication information is used to indicate the usage time of a beam used by each network device among a group of network devices for transmitting information.

Optionally, the second information further includes a first quantity of second time indication information, where the first quantity is equal to the number of network devices in a group of network devices, and a piece of second time indication information is used to indicate the usage time of the beam used by the network device corresponding to the information among a group of network devices for transmitting information.

Optionally, the method further includes:

transmitting third time indication information, where the third time indication information is used to indicate the usage time of the beam used by each network device among a group of network devices for transmitting information.

Optionally, the method further includes:

transmitting time configuration information, the time configuration information includes a second quantity of fourth time indication information, the second quantity is equal to the number of network devices in a group of network devices, and a piece of fourth time indication information is used to indicate the usage time of the beam used by the network device corresponding to the indication information among the group of network devices for transmitting information.

Optionally, the method further includes:

transmitting first configuration information, where the first configuration information is used to configure a corresponding relationship between each piece of first information included in the at least one first information and an identifier of a network device corresponding to the first information among a group of network devices.

Optionally, the method further includes:

transmitting third information, where the third information is used to determine the usage time of at least one first beam used by the first network device for transmitting information.

Optionally, transmitting the third information includes:

transmitting fourth information; where the fourth information is used to determine the start time of at least one first beam used by the first network device for transmitting information; and transmitting fifth information, where the fifth information is used to determine the duration of at least one first beam used by the first network device for transmitting information.

Optionally, the method may further include:

transmitting sixth information, where the sixth information is used to configure at least one second beam used by the first network device for transmitting information.

Optionally, the method further includes: receiving beam measurement results of each of second beams transmitted by the user equipment;

determining at least one first beam from the at least one second beam according to the beam measurement results of each of second beams.

It can be understood that the contents of the method which takes the base station as the execution body is the same as the content of the method which takes the repeater as the execution body in the foregoing description, but it is described from different perspectives. For contents of the method which takes the base station as the execution body, it may refer to the foregoing detailed description of the corresponding part in the method which takes the repeater as the execution body. For each network device, the network device may obtain corresponding information from the base station, and determine information such as at least one beam for transmitting information, the type of beam, and the usage time of the beam based on the obtained information. If the base station is configured with information corresponding to multiple network devices, each network device can determine its own corresponding information from the acquired information, and determine the beam and the usage time of beam according to its own corresponding information. For the base station, the configuration of the base station may be corresponding information of one or more network devices. For example, the first information transmitted by the base station may be one or more, and each piece of first information corresponds to a network device.

Figure 13:
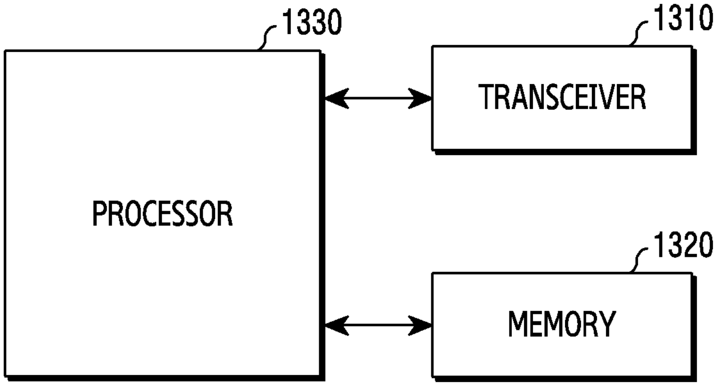
FIG. 13 is a block diagram of a structure of a repeater according to an embodiment of the disclosure.

FIG. 13 illustrates a schematic structural diagram of an electronic device according to an embodiment of the disclosure.

Referring to FIG. 13, the electronic device shown in FIG. 13 includes: a and a memory 1320. The processor 1330 is connected to the memory 1320, for example, through the bus. Optionally, the electronic device may further include a transceiver 1310, and the transceiver 1310 may be used for data interaction between the electronic device and other electronic devices, such as data transmission and/or data reception. It should be noted that, in practical applications, the number of the transceiver 1310 is not limited to one, and the structure of the electronic device does not constitute a limitation to the embodiments of the disclosure.

The processor 1330 may be a central processing unit (CPU), a general-purpose processor, a digital signal processor (DSP), an application specific integrated circuit (ASIC), or a field programmable gate array (FPGA), or other programmable logic devices, transistor logic devices, hardware components, or any combination thereof. It may implement or execute the various logical blocks, modules and circuits described in connection with this disclosure. The processor 1330 may also be a combination for realizing computing functions, such as a combination of one or more microprocessors, a combination of a DSP and a microprocessor, and the like.

The bus may include a path for transferring information between the components described above. The bus may be a peripheral component interconnect (PCI) bus or an extended industry standard architecture (EISA) bus or the like. The bus may be divided into an address bus, a data bus, a control bus, and the like. For ease of presentation, only one thick line is shown in FIG. 13, but it does not mean that there is only one bus or one type of bus.

The memory 1320 may be a read only memory (ROM) or other types of static storage devices that can store static information and instructions, a random access memory (RAM) or other types of storage devices that can store information and instructions. The memory 1320 may also be electrically erasable programmable read only memory (EEPROM), compact disc read only memory (CD-ROM) or other optical disk storage, optical disk storage (including compressed compact disc, laser disc, compact disc, digital versatile disc, blue-ray disc, etc.), magnetic disk storage medium or other magnetic storage device, or any other medium capable of carrying or storing desired program code in the form of instructions or data structures and capable of being accessed by a computer, but not limited to this.

The memory 1320 is used for storing application program codes (computer programs) for executing the solutions of the disclosure, and the execution is controlled by the processor 1330. The processor 1330 is configured to execute the application program code stored in the memory 1320 to implement the content shown in the foregoing method embodiments.

Based on the principle of the communication method system provided by the disclosure, an embodiment of the disclosure further provides a communication apparatus. The communication apparatus may include a receiving module, a beam determining module and a transmitting module. Operations of the receiving module, the beam determining module and the transmitting module may be implemented by the processor 1330. The receiving module, the beam determining module and the transmitting module The receiving module is configured to receive first information used to configure at least one first beam for transmitting information.

The beam determining module is configured to determine at least one first beam based on the first information.

The transmitting module is configured to transmit information based on the determined at least one first beam.

Optionally, the first information is further used to indicate whether each of the first beams is a receiving beam or a transmitting beam.

Optionally, the communication apparatus is included in the first network device, and the beam determining module is configured to:

receive second information, where the second information includes at least one piece of first information, the second information corresponds to a group of network devices, and one piece of first information is used to determine a beam used by a network device corresponding to the first information among the group of network devices for transmitting information;

determine the first information corresponding to the first network device in the second information based on an identifier of the first network device; and determine the at least one first beam based on the determined first information.

Optionally, the beam determining module may also be configured to perform at least one of the following:

determining the usage time of at least one first beam based on the determined first information, where each piece of first information included in the second information is further used to determine the usage time of the beam used by the network device corresponding to the first information;

determining the usage time of at least one first beam based on the first time indication information, where the second information further includes a piece of the first time indication information, and the first time indication information is used to indicate the usage time of the beam used by each network device among the group of network devices for transmitting information;

determining the second time indication information corresponding to the first network device in the second information based on the identifier of the first network device; and determining the usage time of at least one first beam based on the determined second time indication information; where the second information further includes a first quantity of second time indication information, where the first quantity is equal to the number of network devices in the group of network devices, and a piece of second time indication information is used to indicate the usage time of the beam used by the network device corresponding to the indication information among the group of network devices for transmitting information;

receiving a piece of third time indication information, where the third time indication information is used to indicate the usage time of the beam used by each network device among the group of network devices for transmitting information; and determining the usage time of at least one first time based on the third time indication information;

receiving time configuration information, where the time configuration information includes a second quantity of fourth time indication information, the second quantity is equal to the number of network devices in the group of network devices, and a piece of fourth time indication information is used to indicate the usage time of the beam used by the network device corresponding to the indication information among the group of network devices for transmitting information; determining the fourth time indication information corresponding to the first network device in the time configuration information based on the identifier of the first network device; and determining the usage time of the at least one first beam based on the determined fourth time indication information.

The transmitting module is configured to transmit information based on the determined at least one first beam and the usage time of the at least one beam.

Optionally, the beam determining module is configured to:

acquire first configuration information, where the first configuration information is used to configure a corresponding relationship between each piece of first information included in the at least one first information and an identifier of a network device corresponding to the first information among the group of network devices; and determine the first information corresponding to the first network device in the second information based on the identifier of the first network device and the first configuration information.

Optionally, the beam determining module may be configured to receive first signaling, where the first signaling carries the first information; where the first signaling includes at least one of the followings:

higher layer signaling, media access layer signaling, or physical layer signaling.

Optionally, the first signaling is physical layer signaling, and the receiving the first signaling includes at least one of the following:

acquiring the first signaling from the specific search space corresponding to the first network device; and acquiring the first signaling from a common search space corresponding to the first network device.

Optionally, the beam determining module may also be configured to perform at least one of the following:

determining the usage time of the at least one first beam based on the first information;

acquiring third information, where the third information is used to determine the usage time of the at least one first beam; determining the usage time of the at least one first beam based on the third information.

Correspondingly, the transmitting module may be configured to transmit information based on the at least one first beam and the usage time of the at least one first beam.

Optionally, the usage time of a beam includes the start time and duration of the beam.

Optionally, the third information is used to indicate the start time and duration of the at least one first beam, and the third information is agreement information or received information.

Alternatively, when acquiring the third information, the beam determining module is configured to acquire fourth information and fifth information, where the fourth information is used to determine the start time of the at least one first beam, the fifth information is used to determine the duration of the at least one first beam, and the fourth information is agreement information or received information, and the fifth information is the agreement information or the received information.

Optionally, the first information or the third information includes at least one of a first offset value or first time, and the first offset value is the offset value between the start time of at least one beam in the at least one first beam and the acquisition time of the first information; the first time includes the duration of at least one of the at least one first beam; correspondingly, the beam determining module can be configured to perform at least one of the following:

determining the start time of at least one first beam based on the first offset value and the acquisition time of the first information;

determining the duration of the at least one first beam based on the first time.

Optionally, the first information includes a first indication value; the beam determining module may be configured to determine at least one first beam based on the first indication value.

Optionally, the beam determining module may be configured to determine at least one first beam based on the first indication value and the first mapping relationship; where the first mapping relationship includes a corresponding relationship between each indication value in a set of first indication values and at least one beam corresponding to the indication value.

Optionally, the beam determining module may be configured to determine at least one first beam corresponding to the first indication value and the usage time of the at least one first beam based on the first indication value and the second mapping relationship.

The second mapping relationship includes: each indication value in a set of second indication values, at least one beam corresponding to each indication value, and a corresponding relationship between the time information of each beam corresponding to each indication value.

Correspondingly, the transmitting module may be configured to transmit information based on the at least one first beam and the usage time of the at least one first beam.

Optionally, the beam determining module may be configured to acquire a second indication value, where the second indication value is used to configure the usage time of at least one first beam; and determine the usage time of the at least one first beam based on the second indication value.

Optionally, the beam determining module may be configured to determine the usage time of at least one first beam corresponding to the second indication value based on the second indication value and the third mapping relationship; where the third mapping relationship includes a corresponding relationship between each indication value in a set of third indication values and at least one beam corresponding to the indication value.

Optionally, the time information of each beam in the at least one first beam is continuous in time; when the beam determining module determines the usage time of the at least one first beam, the beam determining module may be configured to determine the start time of at least one beam in the at least one first beam and the duration of each of first beams; acquire the usage time of each of first beams based on the determined start time of the at least one beam and the duration of each of first beams; the usage time of a beam includes the start time and duration of the beam.

Optionally, the beam determining module may also be configured to acquire sixth information, where the sixth information is used to configure at least one second beam for transmitting information; and determine the at least one second beam based on the sixth information; the transmitting module may also be configured to transmit information through each of the second beams.

Optionally, the at least one second beam includes at least one first beam.

Optionally, the at least one second beam is used periodically, and the sixth information is also used to configure the usage period of the at least one second beam and the usage time of each of second beams.

The beam determining module may be configured to determine at least one second beam, a usage period of the at least one second beam, and the usage time of each of second beams based on the sixth information.

The transmitting module is configured to periodically use each of second beams to transmit information based on each of second beams and the usage time of the second beam.

Optionally, the beam determining module may be configured to determine the usage time of at least one first beam; if overlapping time is presented between the usage time of the at least one first beam and the usage time of the at least one second beam, for the first beam and the second beam having the overlapping time, the transmitting module is further configured to perform at least one of the followings:

- transmitting information based on the first beam and the usage time of the first beam, and not transmitting information on the at least one second beam during the current period;
- transmitting information based on the at least one second beam and the usage time of each of second beams, and not transmitting information on the first beam during the current period;
- transmitting information based on the at least one second beam and the usage time of respective second beams, and transmitting information based on the first beam and non-overlapping time of the first beam during the current period, where the non-overlapping time is time of the usage time of the first beam except for the overlapping time;
- transmitting information based on the first beam and the usage time of the first beam, and transmitting information based on the at least one second beam and the usage time of respective second beams.

Optionally, the transmission of information includes transmitting and/or receiving information, and the information includes at least one of the following: uplink data; uplink control information; downlink data; downlink control information.

The at least one first beam comprises at least one of the followings: at least one transmitting beam; at least one receiving beam.

The communication apparatus provided in the embodiment of the disclosure may be implemented as a device on the network side, such as a repeater or a network device with other names. The apparatus of the embodiments of the disclosure can perform the methods provided by the embodiments of the disclosure, and the implementation principles thereof are similar. The actions performed by each module in the apparatus of the embodiments of the disclosure are the same as the steps in the methods of the embodiments of the disclosure. Correspondingly, for the detailed functional description of each module of the apparatus, reference may be made to the description in the corresponding method shown above, and details are not repeated here.

An embodiment of the disclosure also provides a communication device, which may be implemented as a base station or a functional module in the base station, the communication device includes a communication module, and the module is configured to transmit first information, where the first information is used to configure at least one first beam used by the first network device for transmitting information.

Optionally, the communication module can also be configured to transmit sixth information, where the sixth information is used to configure at least one second beam used by the first network device for transmitting information.

Optionally, the communication module is also configured to: receive a beam measurement result of each of second beams transmitted by the user equipment; and determine at least one first beam from the at least one second beam based on the beam measurement results of each of second beams.

Based on the same principle as the method provided by the embodiment of the disclosure, the embodiment of the disclosure provides an electronic device, the electronic device includes: a memory and a processor; at least one program stored in the memory, which is executed by the processor to perform the method provided in any optional embodiment of the disclosure. The device includes at least one processor, and the at least one processor is configured to execute the method provided in any optional embodiment of the disclosure. Optionally, the electronic device may be the aforementioned repeater, or may be a base station.

Figure 14:
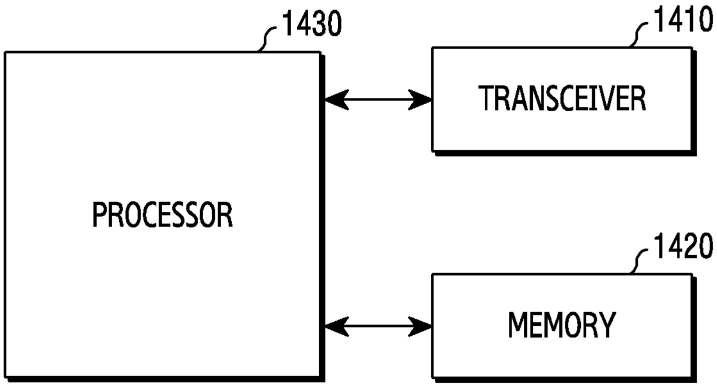
FIG. 14 is a block diagram of an internal configuration of a UE, according to an embodiment of the disclosure.

FIG. 14 is a block diagram of an internal configuration of a base station, according to an embodiment of the disclosure.

Referring to FIG. 14, the base station according to an embodiment may include a transceiver 1410, a memory 1420, and a processor 1430. The transceiver 1410, the memory 1420, and the processor 1430 of the base station may operate according to a communication method of the base station described above. However, the components of the base station are not limited thereto. For example, the base station may include more or fewer components than those described above. In addition, the processor 1430, the transceiver 1410, and the memory 1420 may be implemented as a single chip. Also, the processor 1430 may include at least one processor. Furthermore, the base station of FIG. 14 corresponds to the gNB 102 of the FIG. 3B.

The transceiver 1410 collectively refers to a base station receiver and a base station transmitter, and may transmit/receive a signal to/from a terminal. The signal transmitted or received to or from the terminal may include control information and data. The transceiver 1410 may include a RF transmitter for up-converting and amplifying a frequency of a transmitted signal, and a RF receiver for amplifying low-noise and down-converting a frequency of a received signal. However, this is only an example of the transceiver 1410 and components of the transceiver 1410 are not limited to the RF transmitter and the RF receiver.

Also, the transceiver 1410 may receive and output, to the processor 1430, a signal through a wireless channel, and transmit a signal output from the processor 1430 through the wireless channel.

The memory 1420 may store a program and data required for operations of the base station. Also, the memory 1420 may store control information or data included in a signal obtained by the base station. The memory 1420 may be a storage medium, such as read-only memory (ROM), random access memory (RAM), a hard disk, a CD-ROM, and a digital versatile disc (DVD), or a combination of storage media.

The processor 1430 may control a series of processes such that the base station operates as described above. For example, the transceiver 1410 may receive a data signal including a control signal transmitted by the terminal, and the processor 1430 may determine a result of receiving the control signal and the data signal transmitted by the terminal.

Figure 15:
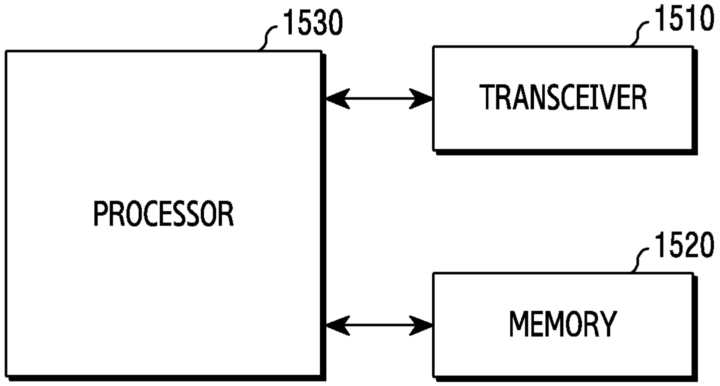
FIG. 15 is a block diagram of an internal configuration of a base station, according to an embodiment of the disclosure.

FIG. 15 is a block diagram showing an internal structure of a UE, according to an embodiment of the disclosure.

Referring to FIG. 15, the terminal of the disclosure may include a transceiver 1510, a memory 1520, and a processor 1530. The transceiver 1510, the memory 1520, and the processor 1530 of the terminal may operate according to a communication method of the terminal described above. However, the components of the terminal are not limited thereto. For example, the terminal may include more or fewer components than those described above. In addition, the processor 1530, the transceiver 1510, and the memory 1520 may be implemented as a single chip. Also, the processor 1530 may include at least one processor. Furthermore, the UE of FIG. 15 corresponds to the UE 116 of the FIG. 3A.

The transceiver 1510 collectively refers to a terminal receiver and a terminal transmitter, and may transmit/receive a signal to/from a base station. The signal transmitted or received to or from the base station may include control information and data. In this regard, the transceiver 1510 may include a RF transmitter for up-converting and amplifying a frequency of a transmitted signal, and a RF receiver for amplifying low-noise and down-converting a frequency of a received signal. However, this is only an example of the transceiver 1510 and components of the transceiver 1510 are not limited to the RF transmitter and the RF receiver.

Also, the transceiver 1510 may receive and output, to the processor 1530, a signal through a wireless channel, and transmit a signal output from the processor 1530 through the wireless channel.

The memory 1520 may store a program and data required for operations of the terminal. Also, the memory 1520 may store control information or data included in a signal obtained by the terminal. The memory 1520 may be a storage medium, such as ROM, RAM, a hard disk, a CD-ROM, and a DVD, or a combination of storage media.

The processor 1530 may control a series of processes such that the terminal operates as described above. For example, the transceiver 1510 may receive a data signal including a control signal, and the processor 1530 may determine a result of receiving the data signal.

In one embodiment, a method is provided. The method includes receiving first information to configure a plurality of first beams for transmitting data, determining at least one first beam from the plurality of first beams based on the first information, and transmitting the data based on the at least one first beam.

In one embodiment, wherein the first information further indicates whether each of the plurality of first beams is a receiving beam or a transmitting beam.

In one embodiment, wherein the receiving of the first information comprises: receiving second information, wherein the second information corresponds to a group of network devices, and the second information is used to determine a beam used by a network device corresponding to the first information among the group of network devices for transmitting the data, and wherein the determining of the at least one first beam from the plurality of first beams based on the first information comprises: determining information corresponding to the first network device in the second information based on an identifier of the first network device, and determining the at least one first beam based on the determined information.

In one embodiment, the method further includes determining a usage time of the at least one first beam based on the determined information, wherein the second information is further used to determine a usage time of a beam used by the network device corresponding to the first information; determining the usage time of the at least one first beam based on first time indication information, wherein the second information further includes a piece of the first time indication information, and the first time indication information is used to indicate a usage time of each beam used by each network device among the group of network devices for transmitting the data; determining second time indication information corresponding to the first network device in the second information based on the identifier of the first network device; and determining the usage time of the at least one first beam based on the determined second time indication information, wherein the second information further includes a first quantity of the second time indication information, the first quantity is equal to a total number of network devices in the group of network devices, and a piece of the second time indication information is used to indicate the usage time of the beam used by the network device corresponding to indication information among the group of network devices for transmitting the data; receiving a piece of third time indication information, wherein the third time indication information is used to indicate the usage time of each beam used by each network device among the group of network devices for transmitting the data; and determining the usage time of the at least one first beam based on the third time indication information; or receiving time configuration information, wherein the time configuration information includes a second quantity of fourth time indication information, the second quantity is equal to the total number of network devices in the group of network devices, and a piece of the fourth time indication information is used to indicate the usage time of the beam used by the network device corresponding to the indication information among the group of network devices for transmitting the data; determining the fourth time indication information corresponding to the first network device in the time configuration information based on the identifier of the first network device; and determining the usage time of the at least one first beam based on the determined fourth time indication information, wherein the transmitting of the data based on the determined at least one first beam comprises:

transmitting the data based on the determined at least one first beam and the usage time of the at least one first beam.

In one embodiment, the method further includes acquiring first configuration information, wherein the first configuration information is used to configure a corresponding relationship between each piece of first information included in the first information and an identifier of a network device corresponding to the first information among the group of network devices, wherein the determining of the first information corresponding to the first network device in the second information based on the identifier of the first network device comprises: determining the first information corresponding to the first network device in the second information based on the identifier of the first network device and the first configuration information.

In one embodiment, wherein the receiving of the first information comprises: receiving first signaling, wherein the first signaling carries the first information, and wherein the first signaling includes at least one of: higher layer signaling, media access layer signaling, or physical layer signaling.

In one embodiment, the method further includes determining a usage time of the at least one first beam based on the first information; acquiring third information, wherein the third information is used to determine the usage time of the at least one first beam; or determining the usage time of the at least one first beam based on the third information, wherein the transmitting of the data based on the determined at least one first beam comprises: transmitting the data based on the at least one first beam and the usage time of the at least one first beam.

In one embodiment, wherein the first information comprises: a first indication value, and wherein the determining of the at least one first beam based on the first information comprises: determining the at least one first beam based on the first indication value.

In one embodiment, wherein the determining of the at least one first beam based on the first indication value comprises: determining the at least one first beam based on the first indication value and a first mapping relationship, and wherein the first mapping relationship comprises: a corresponding relationship between each indication value in a set of first indication values and at least one beam corresponding to the indication value.

In one embodiment, the method further includes acquiring a second indication value, wherein the second indication value is used to configure a usage time of the at least one first beam; and determining the usage time of the at least one first beam based on the second indication value, wherein the transmitting of the data based on the at least one first beam comprises: transmitting the data based on the at least one first beam and the usage time of the at least one first beam.

In one embodiment, the method further includes acquiring sixth information, wherein the sixth information is used to configure at least one second beam for transmitting the data; and determining the at least one second beam based on the sixth information to transmitting the data through each of the at least one second beams.

In one embodiment, wherein the at least one second beam is used periodically, and the sixth information is further used to configure a usage period of the at least one second beam and usage time of each of the at least one second beams, and wherein the determining the at least one second beam based on the sixth information to transmit the data through each of the at least one second beams comprises: determining the at least one second beam, the usage period of the at least one second beam, and the usage time of each of the at least one second beams based on the sixth information, and transmitting the data through periodically using respective second beams based on each of the at least one second beams and the usage time of the at least one second beam.

In one embodiment, the method further includes determining the usage time of the at least one first beam; and in a case that overlapping time is presented between the usage time of the at least one first beam and the usage time of the at least one second beam, for the first beam and the second beam having the overlapping time, wherein the method further comprises at least one of: transmitting the data based on the first beam and the usage time of the first beam, and not transmitting the data on the at least one second beam during a current period, transmitting the data based on the at least one second beam and the usage time of each of second beams, and not transmitting the data on the first beam during the current period, transmitting the data based on the at least one second beam and the usage time of respective second beams, and transmitting the data based on the first beam and non-overlapping time of the first beam during the current period, wherein the non-overlapping time is time of the usage time of the first beam except for the overlapping time, transmitting the data based on the first beam and the usage time of the first beam, or transmitting the data based on the at least one second beam and the usage time of respective second beams.

In one embodiment, wherein the transmitting of the data comprises: transmitting the data, or receiving the data, wherein the data comprises at least one of: uplink data, uplink control information, downlink data, or downlink control information, and wherein the at least one first beam comprises at least one of: at least one transmitting beam, or at least one receiving beam.

In one embodiment, a method is provided. The method includes transmitting first information, wherein the first information is used to configure at least one first beam used by a first network device for transmitting data.

In one embodiment, wherein the first information further indicates whether each of the plurality of first beams is a receiving beam or a transmitting beam.

In one embodiment, wherein the transmitting of the first information comprises: transmitting second information, wherein the second information corresponds to a group of network devices, and the second information is used to determine a beam used by a network device corresponding to the first information among the group of network devices for transmitting the data, wherein the first information included in the second information is further used to determine a usage time of a beam used by the network device corresponding to the first information.

In one embodiment, the method further includes transmitting third time indication information, wherein the third time indication information is used to indicate the usage time of each beam used by each network device among the group of network devices for transmitting the data; and transmitting time configuration information, wherein the time configuration information includes a second quantity of fourth time indication information, the second quantity is equal to the total number of network devices in the group of network devices, and a piece of the fourth time indication information is used to indicate the usage time of the beam used by the network device corresponding to the indication information among the group of network devices for transmitting the data.

In one embodiment, the method further includes transmitting first configuration information, wherein the first configuration information is used to configure a corresponding relationship between each piece of first information included in the first information and an identifier of a network device corresponding to the first information among the group of network devices.

In one embodiment, the method further includes transmitting third information, wherein the third information is used to determine the usage time of at least one first beam used by the first network device for transmitting the data.

An embodiment of the disclosure provides a non-transitory computer-readable storage medium, where a computer program is stored on the computer-readable storage medium, and when the computer program is executed by a processor, the steps of the foregoing method embodiments may be implemented.

Embodiments of the disclosure further provide a non-transitory computer program product, including a computer program, and when the computer program is executed by a processor, the steps of the foregoing method embodiments may be implemented.

The methods according to the embodiments described in the claims or the detailed description of the disclosure may be implemented in hardware, software, or a combination of hardware and software.

When the electrical structures and methods are implemented in software, a non-transitory computer-readable recording medium having one or more programs (software modules) recorded thereon may be provided. The one or more programs recorded on the non-transitory computer-readable recording medium are configured to be executable by one or more processors in an electronic device. The one or more programs include instructions to execute the methods according to the embodiments described in the claims or the detailed description of the disclosure.

The programs (e.g., software modules or software) may be stored in random access memory (RAM), non-volatile memory including flash memory, read-only memory (ROM), electrically erasable programmable read-only memory (EEPROM), a magnetic disc storage device, compact disc-ROM (CD-ROM), a digital versatile disc (DVD), another type of optical storage device, or a magnetic cassette. Alternatively, the programs may be stored in a memory system including a combination of some or all of the above-mentioned memory devices. In addition, each memory device may be included by a plural number.

The programs may also be stored in an attachable storage device which is accessible through a communication network such as the Internet, an intranet, a local area network (LAN), a wireless LAN (WLAN), or a storage area network (SAN), or a combination thereof. The storage device may be connected through an external port to an apparatus according to the embodiments of the disclosure. Another storage device on the communication network may also be connected to the apparatus performing the embodiments of the disclosure.

It should be understood that although the various steps in the flowchart of the accompanying drawings are sequentially shown in the order indicated by the arrows, these steps are not necessarily executed in sequence in the order indicated by the arrows. Unless explicitly stated herein, the execution of these steps is not strictly limited to the order and may be performed in other orders. Moreover, at least a part of the steps in the flowcharts of the accompanying drawings may include multiple sub-steps or multiple stages, and these sub-steps or stages are not necessarily executed at the same time, but may be executed at different times, and the execution sequence is also It does not have to be performed sequentially, but may be performed alternately or alternately with other steps or at least a portion of sub-steps or stages of other steps.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a repeater in a wireless communication system, the method comprising:

receiving, from a base station, configuration information on a time resource for an aperiodic forwarding;

receiving, from the base station, downlink control information (DCI) including information for indicating a beam and information for indicating the time resource associated with the beam for the aperiodic forwarding; and transmitting, to a terminal, signal on the time resource corresponding to the beam, wherein the configuration information includes information on an offset and information on a duration associated with the time resource.

2. The method of claim 1, wherein beam indexes related with the aperiodic forwarding are sequentially associated with time resource indications related with the aperiodic forwarding with one to one mapping.

3. The method of claim 1, wherein a bitwidth of the information for indicating the beam and a bitwidth of the information for indicating the time resource are identified by the configuration information.

4. A method performed by a base station in a wireless communication system, the method comprising:

transmitting, to repeater, configuration information on a time resource for an aperiodic forwarding; and transmitting, to the repeater, downlink control information, DCI, including information for indicating a beam and information for indicating the time resource associated with the beam for the aperiodic forwarding, and wherein a transmission and a reception of a signal are performed on the time resource corresponding to the beam, wherein the configuration information includes information on an offset and information on a duration associated with the time resource.

5. The method of claim 4, wherein beam indexes related with the aperiodic forwarding are sequentially associated with time resource indications related with the aperiodic forwarding with one to one mapping.

6. The method of claim 4, wherein a bitwidth of the information for indicating beam and a bitwidth of the information for indicating the time resource are identified by the configuration information.

7. A repeater comprising:

at least one transceiver;

at least one processor communicatively coupled to the at least one transceiver; and at least one memory, communicatively coupled to the at least one processor, storing instructions executable by the at least one processor individually or in any combination to cause the repeater to:

receive, from a base station, configuration information on a time resource for an aperiodic forwarding, receive, from the base station, downlink control information (DCI) including information for indicating a beam and information for indicating the time resource associated with the beam for the aperiodic forwarding, and transmit, to a terminal, signal on time resource corresponding to the beam, wherein the configuration information includes information on an offset and information on a duration associated with the time resource.

8. The repeater of claim 7, wherein beam indexes related with the aperiodic forwarding are sequentially associated with time resource indications related with the aperiodic forwarding with one to one mapping.

9. The repeater of claim 7, wherein a bitwidth of the information for indicating the beam and a bitwidth of the information for indicating the time resource are identified by the configuration information.

10. A base station comprising:

at least one transceiver;

at least one processor communicatively coupled to the at least one transceiver; and at least one memory, communicatively coupled to the at least one processor, storing instructions executable by the at least one processor individually or in any combination to cause the base station to:

transmit, to a repeater, configuration information on a time resource for an aperiodic forwarding, and transmit, to the repeater, downlink control information, DCI, including information for indicating a beam and information for indicating the time resource associated with the beam for the aperiodic forwarding, and wherein a transmission and a reception of a signal are performed on the time resource corresponding to the beam, wherein the configuration information includes information on an offset and information on a duration associated with the time resource.

11. The base station of claim 10, wherein beam indexes related with the aperiodic forwarding are sequentially associated with time resource indications related with the aperiodic forwarding with one to one mapping.

12. The base station of claim 10, wherein a bitwidth of the information for indicating beam and a bitwidth of the information for indicating the time resource are identified by the configuration information.

* * * * *